(12) United States Patent
Vaswani et al.

(10) Patent No.: US 6,252,606 B1
(45) Date of Patent: Jun. 26, 2001

(54) ERROR CORRECTION IN A GRAPHICS PROCESSOR

(75) Inventors: Gautam Vaswani, Austin; Daniel P. Wilde, Cedar Park; Patrick Harkin, Austin, all of TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/106,874

(22) Filed: Jun. 30, 1998

(51) Int. Cl.$^7$ .................................................. G06T 11/20
(52) U.S. Cl. ............................................................ 345/441
(58) Field of Search ............................................... 345/441

(56) References Cited

U.S. PATENT DOCUMENTS

| | | | |
|---|---|---|---|
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Mez | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,625,768 | 4/1997 | Dye | 395/141 |

FOREIGN PATENT DOCUMENTS 9636011    11/1996    (WO) .

*Primary Examiner*—Jeffery Brier
*Assistant Examiner*—Motilewa Good-Johnson
(74) *Attorney, Agent, or Firm*—Robert P. Bell; Peter T. Rutkowski

(57) ABSTRACT

A graphics processor capable of rendering three-dimensional polygons with color, shading; and other visual effects also corrects interpolation errors that occur as a result of mapping the polygon to a pixel grid display. The processor renders polygons using an Incremental Line-Drawing algorithm and features an error correction circuit capable of adjusting the initial and incremental gradient parameters for each pixel characteristic and then rendering each scan line with the proper orthogonal adjustment. The error correction circuit includes an ortho correction engine for correcting errors in the initial and incremental pixel parameters and an ortho adjust engine to accommodate overflows in the x-coordinate calculations. The processor is able to render the polygons with monotonic gradients in color, shading, depth, and other visual characteristics without interpolation error.

50 Claims, 16 Drawing Sheets

Microfiche Appendix Included
(1 Microfiche, 61 Pages)

ERROR CORRECTION IN A GRAPHICS PROCESSOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

This patent document includes a Microfiche appendix consisting of 1 microfiche with 61 frames.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

1. Field of the Invention

The present invention relates to computer systems and particularly to graphics processors. More particularly, the present invention relates to a graphics processor adapted to remove interpolation errors from parameters defining a polygon and render the polygon on a computer display.

2. Background of the Invention

Recent advances in graphics processing technology have allowed computer display devices to deliver higher resolution, greater rendering precision, and faster processing speed. Such advances have enabled computers to better perform the complex instructions demanded by graphics-intensive software applications offering movie playback, interactive video, multimedia, games, drawing or drafting capabilities, and other video-intensive tasks. One important feature of these applications is the capability to quickly and accurately render complex graphic objects on-screen, at the same time incorporating visual effects (also known as "pixel characteristics") such as shading, specular lighting, three-dimensional (3D) perception, texture-mapping, fog or haze effects, alpha blending, depth, and other effects. Such visual effects make the graphics seem more realistic and improve the overall quality of the images.

Shading consists of varying an image color along the span of the image, while the lighting effect is accomplished by multiplying the color intensities of an image by a constant value. Other techniques exist to create 3D effects such as depth and texture-mapping by translating two-dimensional (2D) patterns and shapes so that images appear to have a depth component, even though the images are tendered on a 2D screen. Fog and alpha blending change the appearance of an image in subtler ways. Fog creates the illusion of a mist, or haze throughout the object and may be used in conjunction with other 3D effects to render images that appear to be at far distances. Alpha blending may be used to mesh together, or blend, screen images.

Computer systems typically incorporate raster display systems for viewing graphics, consisting of a rectangular grid of pixels aligned into columns and rows. Typical displays may incorporate screens with 640×480 pixels, 800×600 pixels, 1024×768 pixels, 1280×1024 pixels, or even more pixels. The display device is usually a cathode ray tube (CRT) capable of selectively lighting the pixels in a sweeping motion, moving across each consecutive pixel row ("scan line"), from left to right, top to bottom. Accordingly, an entire screen of pixel values is known as a "video frame," and the display device usually contains a frame buffer consisting of Dynamic Random Access Memory (DRAM or Video Random Access Memory (VRAM) which holds the pixel intensity values for one or more video frames. The frame buffer, updated regularly by the computer or graphics processor, is read by the display device periodically in order to excite the pixels. Frame buffers in color displays typically hold 24-bit values (3 bytes) for each pixel, each byte holding the pixel intensity value for one of the three primary colors, red, green, or blue. Accordingly, the three primary colors are combined to produce a wide spectrum of colors. Liquid crystal display (LCD) systems operate in a similar fashion as do CRT devices.

The pixel intensity values usually are computed and placed into the frame buffer by a graphics processor that is controlled by a software application known as a display driver. The display driver typically handles all of the graphics routines for the software applications running on the host computer by sending parameters to the graphics processor which describe the geometries of the graphics. One common technique for rendering screen images is to partition the images into simple constituent polygons such as triangles or quadrangles and to then render the constituent polygons on the display. Such a technique has two distinct advantages. First, since even very large polygons can be defined in terms of relatively few parameters, the software driver may send only the necessary polygon parameters, as opposed to transmitting a distinct intensity value for each pixel to the graphics processor. By sending a minimum of data per pixel, the software driver has more time in which to transmit increasingly detailed information to the processor about the polygon, including the parameters to describe the visual effects listed above. In one method of defining a polygon via parameters, the software driver uses the polygon vertex coordinates to calculate through interpolation (or "interpolate") the widths of the polygon along each scan line as well as the slopes of the edges between the vertices. A relatively small number of parameters which completely define the polygon may then be transmitted to the graphics processor to define the polygon for rendering.

Second, graphics processors have been developed which are highly successful at implementing elementary polygon-rendering routines. A typical polygon-rendering algorithm uses an initial polygon coordinate along with the polygon height and width and the slopes of the polygon edges to incrementally render the polygon. Beginning at the initial coordinate, the graphics processor enters into the frame buffer a horizontal line of pixels spanning the width of the polygon on the initial pixel row. Using the initial coordinate along with the polygon height and edge slopes, the graphics processor can compute the polygon coordinates along one vertical or slanted edge, called the "main slope," of the polygon. For each consecutive scan line, the graphics processor then uses the width values of the polygon to draw each horizontal row of polygon pixels into the frame buffer. Such an algorithm is known as the Incremental Line-Drawing algorithm, or Digital Differential Analyzer (DDA).

An incremental algorithm for rendering pixels at discrete positions on a pixel grid generally begins at a starting point and proceeds for some number of iterations, calculating the location of a single pixel during each iteration. The location of the current pixel in the scan line during any iteration is calculated by adding an increment, or delta, to the previous coordinate. The number of iterations needed for one scan line is the number of points in that scan line, or the distance to be spanned. Using such an algorithm, a graphics processor can draw polygons that are random triangles of any orientation or quadrangles with at least one flat top or bottom. Setting aside trivial triangles and colinear triangles, which are either points or lines, any random triangle or quadrangle can be partitioned into upper and lower triangles with a common horizontal side. The common horizontal side intersects the center, or opposite, vertex of the random triangle or quadrangle. The edge of the triangle or quadrangle opposite this center vertex, or the main slope, always spans the entire height of the triangle or quadrangle. The random quadrangle or triangle may be constructed by invoking an Incremental Line-Drawing algorithm twice-first to draw the upper polygon and again to draw the lower polygon.

Referring now to FIG. 1, triangles 100, 120, 140, and 160 represent the four general orientations of a random triangle. Triangle 100 may be partitioned into two constituent triangles 102 and 104 having common horizontal side 106 and opposite vertex 108. Main slope 110 spans the entire height of triangle 100, while first opposite slope 112 and second opposite slope 114 constitute the other two edges. Triangle 100 can be rendered using the Incremental Line-Drawing algorithm by drawing constituent triangles 102 and 104 separately, as will be explained in greater detail below. Triangles 120, 140, and 160 may be partitioned similarly into triangles 122 and 124 (constituting triangle 120), triangles 142 and 144 (constituting triangle 140), and triangles 162 and 164 (constituting triangle 160). Accordingly, these triangles have main slope 130 (triangle 120), main slope 150 (triangle 140), and main slope 170 (triangle 160) with opposite slopes 132 and 134 (triangle 120), opposite slopes 152 and 154 (triangle 140), and opposite slopes 172 and 174 (triangle 160). Triangles 120, 140 and 160 also have opposite vertex 128 (triangle 120), opposite vertex 148 (triangle 140), and opposite vertex 168 (triangle 160).

Examining the triangles from left to right, the main slopes 110 and 170 of triangles 100 and 160, respectively, have downward gradients, while the main slopes 130 and 150 of triangles 120 and 140, respectively, have upward gradients. The opposite vertices 108 and 148 both lie to the left of respective main slopes 110 and 150, while opposite vertices 128 and 168 both lie to the left of respective main slopes 130 and 170, respectively. Hence, triangles 100 and 140 are said to have negative opposite vertex directions, while triangles 120 and 160 are said to have positive opposite vertex directions. Thus, triangles 100, 120, 140, and 160 embody all four combinations of main slope gradients and opposite vertex directions, thereby constituting the four general types of random triangles. It follows that any one of the four triangles 100, 120, 140, and 160 can be uniquely identified by its main slope gradient and opposite vertex direction.

The parameters needed by a graphics processor to render a quadrangle with flat top and bottom edges or any randomly-oriented triangle typically comprise a set of fractional-valued parameters including a starting x-coordinate $X_{MINT}{:}X_{MFRAC}$, a delta X main $\Delta X_{MINT}{:}\Delta X_{MFRAC}$, a starting line width $W_{MINT}{:}W_{MFRAC}$, and a delta main width $\Delta W_{MINT}{:}\Delta W_{MFRAC}$. A software driver transmits the polygon parameters to the graphics processor, which renders the polygon as described below. Each fractional-valued parameter can be expressed as an integer plus a fraction, with the term "INT" denoting the integer portion and "FRAC" identifying the fractional portion. For example, if $X_{MINT}{:}X_{MFRAC}{=}3.25$, then $X_{MINT}{=}3$ and $X_{MFRAC}{=}¼$. For clarity, the fractional-valued parameters $X_{MINT}{:}X_{MFRAC}$, $\Delta X_{MINT}{:}\Delta X_{MFRAC}$, $W_{MINT}{:}W_{MFRAC}$, and $\Delta W_{MINT}{:}\Delta W_{MFRAC}$ may be abbreviated as $X_M$, $\Delta X_M$, $W_M$, and $\Delta W_M$, respectively, all other fractional-valued parameters expressed herein using similar notation. A graphics processor also receives integer-valued parameters including an initial y coordinate $Y_M$, a polygon height, and, the rendering direction $X_{DIR}$, which defines whether the pixels are drawn from left to right or from right to left across each scan line. In the example of FIG. 1, a graphics engine draws pixels across a scan line from the main slope to the opposite slope, although the pixels may be rendered from opposite slope to main slope in some implementations. By convention, $X_{DIR}$ may be thought of as negative if the main slope lies to the right of the opposite slope or positive if the main slope lies to the left of the opposite slope, and the graphics processor assigns $X_{DIR}{=}0$ if $X_{DIR}$ is positive and $X_{DIR}{=}1$ if $X_{DIR}$ is negative. Notice that the $X_{DIR}$ parameter corresponds exactly to the "opposite vertex direction" defined with respect to the triangles of FIG. 1. Hence, triangles 100 and 140 have $X_{DIR}{=}1$ (negative) while triangles 120 and 160 have $X_{DIR}{=}0$ (positive).

A drawing algorithm similar to the DDA commonly is used by graphics systems to compute and apply visual effects to the pixels of the rendered polygons. Along with the parameters that describe the polygon coordinates, the display driver transmits to the graphics processor a set of parameters that describe the visual effects, or pixel "characteristics," throughout the polygon. The display driver typically calculates these parameters based on the values of the pixel characteristics at the vertices of the polygon. For instance, to display a polygon with red color, the display driver sends to the processor a starting red color value and a pair of gradient values, one gradient value defining the rate of change of red intensity along the main slope of the polygon and the other gradient value defining the rate of change of red intensity between adjacent pixels on a given scan line. In addition to computing the pixel coordinates using the Incremental Line-Drawing algorithm or the like, the graphics processor uses the starting and gradient parameters to assign a red intensity value to each pixel. The graphics processor typically computes the other pixel characteristics, including blue and green intensity and the other visual effects described previously, in the same manner as and concurrently with the polygon coordinate calculations. In fact, even though the pixel depth value is essentially a spatial characteristic like the x- and y-coordinates, the depth characteristic values are usually calculated in the same manner as the other visual effects, using a starting depth value and two gradient values to incrementally assign depth values to each pixel as the polygon is rendered.

A few problems arise when rendering polygon with visual effects onto a pixel grid, however. First, a pixel grid is inherently discrete, i.e. it is not possible to render images between the pixels of a pixel grid. Hence, although interpolation and other techniques may result in fractional-valued polygon parameters, screen images must be mapped to integer-valued pixel locations. One result of such a mapping is that the outlines of some shapes, notably those with slanted and curved edges, may appear jagged on-screen. Higher screen resolutions mitigate this jagged effect, since pixels which are closer together result in a smaller difference (or "error") between the fractional-valued coordinates of the image and the integer-valued pixel coordinates used to display the image. Another problem with pixel-mapping is that some smooth changes, or monotonic gradients, in visual effects such as gradients in color, lighting, texture, fog, and alpha blending may appear uneven, or banded as a result of the mapping error. For instance, a polygon intended to change smoothly from light red at the top of the polygon to dark red at the bottom of the polygon may actually appear to have horizontal bands of single shades of red. Banding artifacts occur frequently in polygon images with steeply sloping side edges and can distort and ruin the intended appearance of these images.

Visual depth effects may also suffer from mapping errors. Depth effects create the illusion of three dimensions, wherein graphics images displayed on a 2D screen may actually appear as 3D objects. A sense of depth perception can make graphic objects look more realistic. Mapping errors, however, can cause objects which are intended to intersect smoothly along a line in 3D to appear to have a jagged intersection. Texture-mapping as well as other 3D effects may also suffer from this problem.

Because these interpolation errors can severely degrade the quality of computer display images, a number of correction schemes have been proposed. As mentioned above, increasing the screen resolution helps to dilute the effects of jagged lines and curves in 2D shapes. Special drawing techniques have also been used to combat jagged lines, such as unweighted area sampling, scan conversion, and interpolated shading techniques such as Gouraud shading. These enhancements do not prevent pixel characteristics from suffering interpolation errors in some images, however. Coplanar polygons, for example, in which each edge lies in a single plane (in contrast with polygons whose edges are curved in 3D), can exhibit considerable banding and other nonlinear artifacts due to interpolation errors, even when rendered on high-resolution screens and when using special drawing techniques. In particular, these errors are particularly noticeable in polygons with steeply sloping side edges and a large orthogonal (horizontal) gradient in one or more pixel characteristics.

For example, a steep slope in a line implies that that line changes slowly in the x-direction per unit change in y-direction. Because polygons are typically drawn in consecutive scan lines, the rate of change of the line in the y-direction is always one pixel per scan line. Hence, the main gradient slope parameter computed by the display driver more specifically defines the rate of change of the main slope in the x-coordinate. The slope parameter for a steep main slope may therefore have a small fractional component. Since the graphics processor typically rounds the pixel coordinates down before rendering, many consecutive pixels along one edge of a polygon may be rounded to the same x-coordinate. Because that edge is sloped, however, the difference, or "error," between the true x-coordinates and the rounded x-coordinates varies from scan line to scan line. The visual effects added to the pixels by the graphics processor thus become shifted in value by varying amounts, each value shifted by a degree proportional to the interpolation error, caused by rounding, of the corresponding pixel coordinate. This uneven shifting of visual characteristics on consecutive scan lines produces the unintended banding effects and jagged intersections mentioned above. Moreover, such problems occur in any visual effect applied to the pixels, including color, lighting, depth, texture-mapping, fog, alpha, depth, and other visual effects.

For example, FIG. 2 illustrates a shaded polygon 200 to be rendered onto a pixel grid. Because FIG. 2 illustrates polygon 200 as an ideal quadrangle superimposed onto coordinate system 203, the graphics controller must translate the parameters of polygon 200 to fit an integer-valued pixel grid. Parameters $X_M$ and $Y_M$ define the starting x and y pixel grid coordinates from which polygon 200 will be rendered. By convention, $X_M$ and $Y_M$ identify the x- and y-coordinates of the main slope upper vertex, although other implementations may define the lower main slope vertex as the initial point. Since polygon 200 has main slope 201, the coordinate pair $(X_M, Y_M)=(2.75, 2)$ defines initial point 205. Accordingly, $X_{MINT}=2$ and $X_{MFRAC}=0.75$. The polygon height parameter defines the vertical height of the polygon, determining the number of scan lines needed to render the polygon. For polygon 200, the polygon height is 6 pixels, since the polygon spans rows (or "scan lines") 2 through 7 of the pixel grid 203.

$W_M$ represents the number of pixels along the initial scan line 2 and corresponds to the initial distance between the main slope 201 and opposite slope 202 of polygon 200. For polygon 200, $W_M=2.0$, since the width between initial point 205 and endpoint 207 along the initial scan line is 2 units. Referring still to FIG. 2, $X_{DIR}=0$ for polygon 200, since main slope 201 is situated to the left of opposite slope 202. Finally, the parameter $\Delta X_M$ defines the gradient of the main slope in terms of the change in x-coordinate per scan line, while $\Delta W_M$ defines the change in the horizontal width of the triangle along the main slope. Thus, $\Delta X_M$ and $\Delta W_M$ for polygon 200 are −0.25 and +0.25, respectively. Accordingly, $\Delta X_{MINT}=0$, $\Delta X_{MFRAC}=-0.25$, $\Delta W_{MINT}=0$, and $\Delta W_{MFRAC}=+0.25$.

The pixel characteristics of a polygon may be sent to the graphics processor in a format similar to the polygon coordinate parameters as described above. For each type of visual effect, the graphics processor receives a starting characteristic parameter which defines the value of the pixel characteristic at the initial polygon pixel (i.e., at $(X_M, Y_M)$), a "delta main" parameter which defines the difference in the characteristic values of adjacent pixels along the main slope of the polygon, and a "delta ortho" parameter which defines difference in the characteristic values of adjacent pixels. These three parameters allow the graphics processor to render polygons with a smooth, or monotonic, change in characteristic values along each scan line.

Still referring to FIG. 2, polygon 200 may be rendered with a gradient in one or more characteristic values. The graphics processor receives a set of parameters for each of the different pixel characteristics, including parameters for red color, green color, blue color, specular red, specular blue, and specular green, depth, and the three texture-mapping coordinates u, v, and w. In the example of FIG. 2, the software driver transmits to the graphics processor parameters $R_M=60$ (a starting red intensity parameter), $\Delta R_M=5$ (delta red main), and $\Delta R_O=20$ (delta red ortho), which define the desired shading effect along polygon 200. The parameter $R_M$ indicates the initial red color intensity at the starting coordinates $(X_M, Y_M)$. The parameter $\Delta R_M$ defines the change in red color intensity between each pixel along the main slope, and $\Delta R_O$ defines the change in red color intensity per pixel in the orthogonal (horizontal) direction, or across each scan line. Given these parameters, a graphics processor can compute red color intensity values for each pixel when polygon 200 is rendered onto a display.

If polygon 200 were rendered on an infinitely precise pixel grid, applying the three red color parameters would result in a smooth, monotonic color change across the surface of polygon 200. The numbers in parentheses throughout FIG. 2 indicate the resulting red color intensities at various points on polygon 200. For instance, the red color value is 60 at the starting point 205. After applying the parameter $R_M=60$ to the starting point 205, the graphics controller can vary the color monotonically along the main slope 201 according to $\Delta R_M$. The points along the main slope 201 thus take red color values of 65 (point 210), 70 (point 215), 75 (point 220), 80 (point 225), and 85 (point 230), a monotonic increase of 5 red color intensity values per main slope pixel. In the orthogonal (horizontal) direction, each point in the interior of polygon 200 and along the opposite slope 202 take on values proportional in $\Delta R_O$ to their distances from the main slope points on the same scan lines. For instance, point 207 lies 2 integer units to the right of corresponding main slope point 205, which has red color intensity 60. Because $\Delta R_O=20$ units per x-coordinate, point 207 has a red color intensity of 100, which is $2*\Delta R_O=40$ units higher than that of point 205. The color gradients along orthogonal scan lines 3 through 7 also exhibit a constant shift of 20 units of color intensity per integer change in the orthogonal direction, as indicated by the red color intensity values in parentheses corresponding to points 210 through 232. Polygon 200 further exhibits a monotonic color gradient of 10 color units per integer change in the vertical direction, as indicated by the colors of point 207 (red=100), point 212 (red=110), point 217 (red=120), point 222 (red=130), point 227 (red=140), and point 232 (red=150) and by the colors of point 206 (red=85), point 211 (red=95), point 216 (red=105), point 221 (red=115), point 226 (red=125), and point 231 (red=135). The vertical gradient follows naturally from the main slope and ortho gradients.

FIG. 3 illustrates the result of a graphics processor using the Incremental Line-Drawing algorithm to interpolate polygon 200 onto pixel grid 303 using the polygon parameters $X_M$, $\Delta X_M$, $W_M$, $\Delta W_M$, $Y_M$, polygon height, and $X_{DIR}$. The graphics processor used to draw polygon 300, however, does not include any type of error correction, and the red shading in polygon 300 appears banded rather than monotonic. Upon receiving the polygon parameters from the software driver, the graphics processor first computes the initial pixel values corresponding to point 205. First, the graphics processor determines the x-coordinate of initial pixel 305 on scan line 2 by rounding $X_M$ down to the nearest integer. Thus, pixel 305 is drawn at (x, y)=(2, 2). The red color intensity for initial pixel 305 is $R_M=60$, by definition. Since $X_{DIR}=0$, the graphics engine renders the remaining pixels in the positive direction (to the right) across the initial scan line. Because the initial scan line width $W_M=2.0$, pixels 306 and 307 are rendered to complete the initial scan line. The graphics processor determines the red color value for each pixel by adding delta red ortho ($\Delta R_O=20$) to each of the preceding pixels. Thus, pixel 306 has a red color value of 80, and pixel 307 has a red color value of 100.

After completing the initial scan line, the graphics processor advances to scan line 3 and computes the main slope x-coordinate by adding $\Delta X_M$ to the previous main slope x-coordinate. Thus the new x-coordinate is 2.75−0.25=2.50, and, rounding down the x-coordinate, the graphics engine draws a new main slope pixel 210 at (x, y)=(2, 3). The red color value for pixel 310 may be determined by adding $\Delta R_M=5$ to the red value of the previous main slope pixel 305. Thus, pixel 310 has red color value 65. The red intensity values along scan line 3 are determined by adding $\Delta R_O=20$ to the value of the preceding pixel. Hence, pixels 311 and 312 have red color intensities 85 and 105, respectively. The graphics processor continues to compute the pixel coordinates and red color values in this manner, rendering each consecutive row of pixels from scan line 4 through scan line 7. Accordingly, main slope pixels are assigned red color values of 70 (pixel 315), 75 (pixel 320), 80 (pixel 325), and 85 (pixel 330).

Because no error correction was used for polygon 300, however, the red color values appear banded. While the red color gradient in polygon 200 was smooth, the red color "jumps" between scan lines 5 and 6. For example, the red color values for pixels 305 (red=60), 310 (red=65), 315 (red=70), and 320 (red=75) progress gradually in steps of 5. The difference between pixels 320 and 326, however, is 25 units of red intensity. This same 25-unit shift in color gradient is also evident between pixels 321 and 327 and between pixels 322 and 328. Thus, instead of having a smooth color gradient throughout, polygon 300 appears to have two distinct red bands.

The source of this banding effect lies in the difference, or error, between the fractional-valued x-coordinates of polygon 300 and the integer-valued pixels which the graphics processor actually renders. Notice that the difference between the x-coordinate of pixel 305 (x=2.75) and the actual, rendered location of pixel 305 (x=2) is ¾ pixel but that ideal starting color and actual starting color are both 60. Thus, the software driver calculated the initial red color value as if the first pixel 305 would be rendered at x=2.75. However, the graphics processor rounded each x-coordinate along scan line 2 by ¾ of a pixel. Comparing the ideal quadrangle of FIG. 2 to the rendered pixels of FIG. 3, it can be seen the rendered pixels along scan line 2 of FIG. 3 have the wrong color values for the x-coordinates at which they were rendered. For instance, point 206 of FIG. 2 was intended to have red color value 85. The pixel in FIG. 3 corresponding to the coordinates of point 206 in FIG. 2, however, has red color 100, a difference of 15 color values. Likewise, the graphics processor rounded the x-coordinate of each pixel on scan line 3 by ½ pixel, effectively shifting each color value on scan line 3 by 10 color values. Also, the graphics processor rounded the x-coordinate of each pixel on scan line 4 by ¼ pixel, effectively shifting each line 4 red color value by 5 color values. Because the fractional x-coordinate for scan line 5 (x=5.0) had no fractional portion, the x-coordinate for pixel 320 needed no rounding. Therefore, the red color values were not shifted on scan line 5. Comparison of pixel 320 with the corresponding pixel 220 of polygon 200 verifies that both pixels have the same color value. It should be noted that although the example of FIG. 3 is directed toward the error induced when shading a polygon with the color red, a similar banding effect may occur with respect to any pixel characteristic that is applied to the polygon. Hence, the example FIG. 3 is representative of interpolation error that may occur in green color, blue color, specular red, specular green, specular blue, u-texel, v-texel, w-texel, alpha, fog, depth, and other pixel characteristics.

One solution to such a problem has been to implement an error-correction algorithm that selectively alters the visual characteristics along each scan line. U.S. Pat. No. 5,625,768 assigned to Cirrus Logic, Inc. discloses a display driver that both generates polygon rendering parameters and calculates error adjustment terms for each pixel characteristic. The error adjustment terms are transmitted to a graphics processor along with the normal pixel parameters and stored into a register file. To compute the pixel characteristic values, the graphics processor first uses a set of interpolation circuits to compute an uncorrected version of each pixel characteristic. However, these uncorrected pixel characteristic values are subject to interpolation errors, as discussed previously. With the error adjustment terms stored in the register file, the graphics processor uses a second set of interpolation circuits to compute the accumulated error for each pixel, adjusting each pixel characteristic to correct the interpolation error. Hence, the graphics processor essentially renders the pixels and then uses the error terms to correct the error that occurred while rendering the pixels.

The corrected values allow the display to avoid the visual defects noted earlier, such as banding and 3D intersection problems. However, such a configuration requires a very complex display driver, which places an extra burden on the host computer system. In addition, the software driver must transmit extra correction parameters to the graphics processor, requiring roughly twice the amount of communications bandwidth between the computer and the graphics processor as is needed to transmit polygon parameters only. Further, the graphics processor requires a large amount of register file space to store both the polygon parameters and the error correction parameters.

In addition, the graphics processor uses an error correction circuit coupled to each pixel characteristic interpolator, the error correction circuit adapted to correct each characteristic of a pixel after that characteristic has been calculated. Such a configuration not only results in an excessive amount of hardware but also increases the amount of calculation time, or latency, required to generate the pixel characteristic values, since the pixel characteristic value must essentially pass through two computations: one calculation to determine the uncorrected pixel value, and another calculation to correct the pixel value for interpolation error.

In light of the foregoing reasons, there remains a need for an effective yet efficient error correction system capable of adjusting pixel characteristic values in polygons rendered by a graphics processor. Such a system should be capable of rendering a polygon from a standard set of interpolation parameters without excessive hardware complexity or latency. Further, such an error correction system should integrate seamlessly with the CPU, using minimal computer memory while requiring as few CPU calculations as possible. To date, no such system is known that incorporates such features.

SUMMARY OF THE INVENTION

Accordingly, there is provided herein a graphics processor capable of receiving parameters defining a polygon from a display driver, adapting the parameters to anticipate and prevent interpolation error, and rendering a polygon using the corrected parameters. The present invention is capable of rendering polygons with any number of pixel characteristics, including color, specular lighting, depth, texture-mapping, fog, alpha blending, and any other suitable visual screen effects. Because the graphics processor implements all of the error correction calculations, an accompanying display driver need only transmit the basic polygon parameters. Thus, a simple, efficient software driver may be used, saving valuable computer memory, CPU time, and communications bandwidth between the CPU and graphics processor.

The graphics processor receives from the software display driver parameters with both integer and fractional portions, or "fractional-valued parameters," describing a polygon from a software driver, including an initial x-coordinate, an initial y-coordinate, a polygon height, an initial line width, a rendering direction, an X main slope, and a delta X width, storing these parameters into a register file. The software driver also transmits to the graphics processor a set of parameters for each visual effect (or "pixel characteristic"), including a starting characteristic value, a "delta main" slope value, and a "delta ortho" slope value. The delta main and delta ortho parameters define the gradients of the characteristic values along the main slope and in the orthogonal (horizontal) direction, respectively. The characteristic parameters are also stored in the register file. Since the graphics processor is capable of rendering pixels with a plurality of different pixel characteristics, the graphics processor receives a starting parameter, a delta main parameter, and a delta ortho parameter for each pixel characteristic.

The graphics processor also includes an ortho correction engine capable of reading the characteristic parameters from the register file, updating the parameters to correct for interpolation error, and writing the parameters back into the register file. To correct the parameters, the ortho correction engine exploits an inherent linearity in the pixel interpolation error. As explained previously, the polygon parameters describe the starting points and main slopes of the polygon as well as the pixel characteristics throughout the polygon. Since the parameters that describe the coordinates of the polygon may be fractionally-valued, some of the polygon pixel coordinates and characteristic values must be rounded down to fit the pixel grid.

Because the ideal pixel characteristics along a given scan line are related to the pixel characteristics of the starting pixel, or main slope pixel, of that scan line by multiples of the orthogonal gradient parameters, shifting the position of the main slope pixel (by rounding its x-coordinate) shifts the locations of the remaining pixel characteristic values along the same scan line by an equivalent distance. To correct the shift in position, each characteristic value must be shifted in a direction opposite to that in which the pixel coordinate is rounded by an amount proportional to the degree of rounding in the x-coordinate. Because the fractional-valued x-coordinate for any pixel along the main slope of a polygon is always a fixed distance from the x-coordinate of the preceding scan line, the amount of rounding necessary for each main slope pixel changes linearly each successive scan line, in proportion to the fractional portion of the delta X main parameter.

The ortho correction engine exploits this linearity by correcting each characteristic parameter once in the register file. When the characteristic parameters have been adjusted, the graphics engine renders the polygon using the Incremental Line-Drawing algorithm. Because the starting and delta main parameters are corrected before rendering, the pixels along the main slope have no interpolation error. Thus the main slope pixels are error-free, and the remaining pixels along each scan line become shifted accordingly, requiring no error correction. First, the graphics engine calculates the x- and y-coordinates and characteristic values of the initial pixel, followed by the remaining pixels along the initial scan line. The graphics engine next calculates the x- and y-coordinates and characteristic values of the main slope pixel of the following scan line, rendering the rest of the scan line by incrementing the characteristic values of each subsequent pixel along that scan line by the corresponding delta ortho values. The graphics engine renders remaining scan lines likewise.

Due to the nature of polygon interpolation, a few selected main slope pixels will be rendered error-free even without prior error correction. In the present invention, these selected main slope pixels will cause the main slope interpolator to overflow (carry) or underflow (borrow) during interpolation. To remove the error correction introduced into these selected pixels, an ortho adjust engine shifts each characteristic value of these selected pixels by the proper delta ortho value to account for the overflow or underflow.

By correcting each characteristic parameter in the register file before rendering the polygon, the graphics engine is able to draw the polygon very efficiently, only requiring periodic ortho-adjustments to the characteristic values along the main slope. The error correction may thus be thought of as "error prevention," since correcting the parameters before rendering the polygon eliminates the need for error correction after rendering. By avoiding error correction post rendering, the present invention achieves a design that is simpler and faster than previous methods.

Because the parameter errors are proportional to the degree of rounding of the x-coordinates, the ortho correction engine calculates a corrected starting error term for a starting characteristic parameter by multiplying the delta ortho parameter by the fractional portion of the starting x-coordinate. A bank of multiplexers couples to the register file so that the parameters may be selectively shifted into the correction engine. If the pixels are drawn across each scan line from left to right, the graphics engine computes the corrected starting characteristic parameter as the sum of the resulting error term and the uncorrected initial characteristic parameter. If the pixels are drawn across each scan line from right to left, the graphics engine computes the corrected initial characteristic parameter as the resulting error term subtracted from the uncorrected initial characteristic parameter. The ortho correction engine calculates a delta main error term for a delta main characteristic parameter by multiplying that delta main characteristic parameter by the fractional portion of the delta X main parameter. If the X direction is negative, the graphics engine computes the corrected delta main characteristic parameter as the sum of the resulting error term and the uncorrected delta main characteristic parameter. If the X direction is positive, the graphics engine computes the corrected delta main characteristic parameter as the resulting error term subtracted from the uncorrected delta main characteristic parameter. Accordingly, the ortho error correction engine consists primarily of a multiplier and an adder/subtractor with operands shifted in directly from the register file. The delta ortho characteristic parameters do not need error correction, since the Incremental Line-Drawing algorithm propagates the main-slope parameter corrections across each scan line.

The rendering circuitry in the graphics processor comprises an x-coordinate interpolator, an interpolator for each characteristic value, and draw engine for asserting control signals. In response to the sequence of control signals from the draw engine, the interpolators calculate the x-coordinate and characteristic values for each pixel, beginning at the initial main slope pixel and proceeding to each consecutive pixel across the initial scan line. The characteristic interpolators assign the error-corrected initial characteristic parameters to the initial pixel, adding the appropriate delta ortho parameter value to the characteristic value of each consecutive pixel across the scan line. After rendering the first scan line, the interpolators calculate the x-coordinate and characteristic values for the main slope pixel on the following scan line by adding the X main slope and error-corrected delta main characteristic parameters to the initial pixel values. If the fractional portion of the x-coordinate interpolator overflows or underflows as described below, an ortho adjust engine adjusts each main slope pixel characteristic value by the appropriate delta ortho parameter. The interpolators then proceed to render the rest of the scan line, incrementing successive pixel characteristic values by the corresponding delta ortho value. The interpolators draw the remainder of the polygon likewise, first rendering a main slope pixel followed by the rest of the scan line.

The ortho adjust engine generally comprises a logic circuit coupled to the x-coordinate interpolator, the x-interpolator consisting primarily of an accumulator. The accumulator computes the x-coordinate of each pixel along the main slope by adding the fractional-valued delta X main parameter to the x-coordinate of the previous main slope pixel. The ortho adjust engine detects when the fractional portion or the x-coordinate overflows or underflows, indicating whether or not to add or subtract a delta ortho from the characteristic values of the current main slope pixel. If an overflow or underflow condition occurs, the ortho adjust engine asserts a delta ortho add signal if the rendering direction points from the main slope of the polygon into the body of the polygon or asserts a delta ortho subtract signal if the rendering direction points from the main slope away from the body of the polygon.

Hence, the present invention discloses a efficient, yet powerful design to correct polygon interpolation errors and render the pixels to be displayed on a pixel grid. Further, the present invention implements the error correction algorithm and rendering entirely, requiring only the intepolated polygon parameters from a display driver. The present invention exploits an inherent linearity in the characteristic error values, using an efficient error-correction engine to correct the irked characteristic parameters before rendering, allowing the rendering apparatus to implement the basic Incremental Line-Drawing algorithm without concurrent error correction. Compared to conventional methods, such a scheme results in lower complexity and reduced latency for rendering corrected pixel characteristics.

Thus, the present invention comprises a combination of features and advantages that enable it to substantially advance the rendering art. These and other characteristics and advantages of the present invention will be readily apparent to those skilled in the art upon reading the following detailed description of the preferred embodiments of the invention and by referring to the accompanying drawings.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENTS

Figure 4:
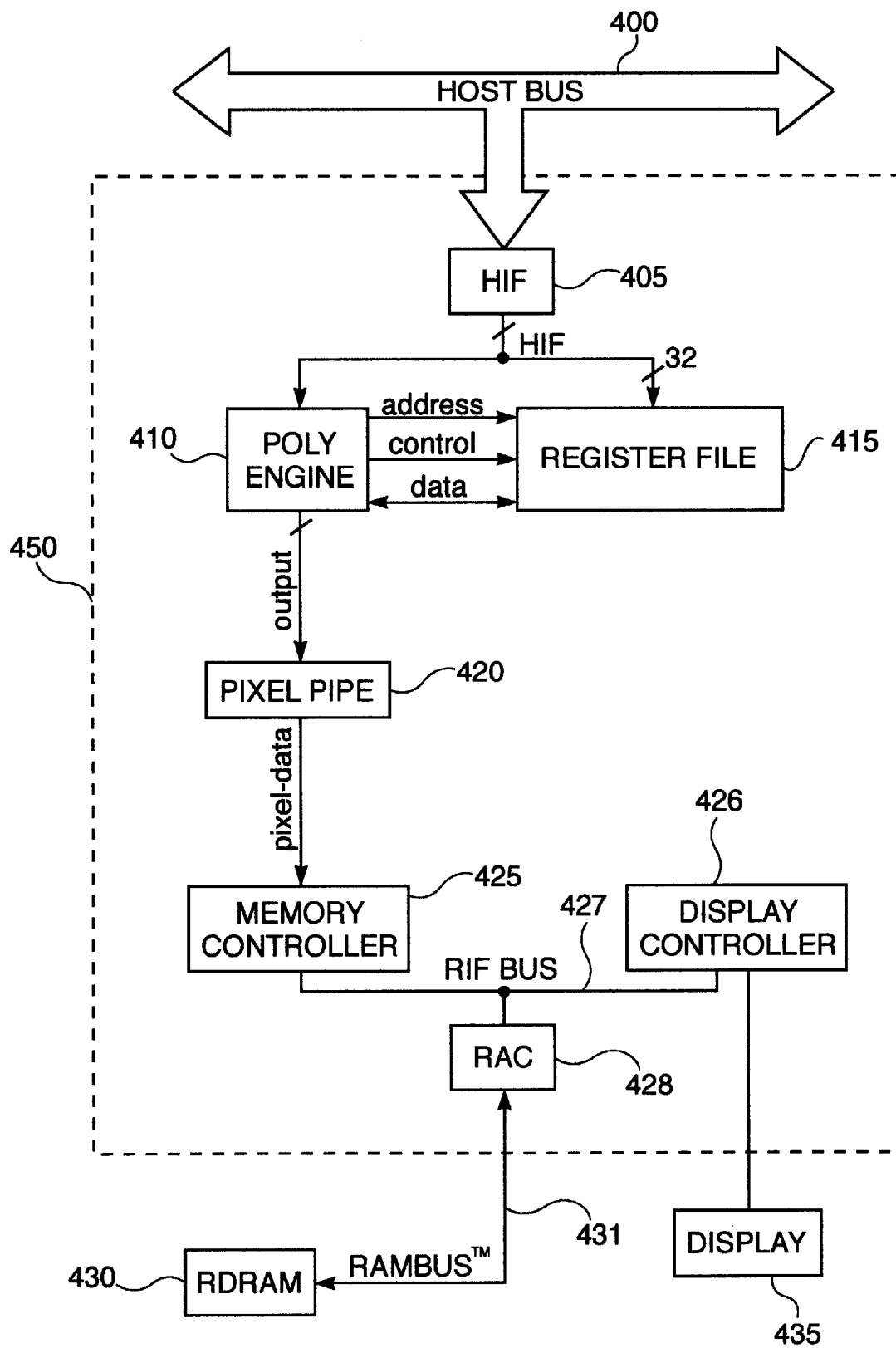
FIG. 4 is a block diagram of a preferred embodiment of a graphics processor.

Referring to FIG. 4, the preferred embodiment of a graphics processor for rendering graphics onto a display unit 450 includes a host interface (HIF) 405, a polygon engine 410, a register file 415, a pixel pipe 420, a memory controller 425, a display controller 426, and Rambus™ Access Circuitry (RAC) 428. Graphics processor 450 preferably also includes circuits for implementing graphics operations such as texture-mapping, video synchronization, bus interfacing, and other typical graphics operations (not shown). The graphics processor 450 preferably communicates with a host computer (not shown) through a host bus 400. The host interface 405 receives data such as polygon parameters over the host bus 400 with the graphics processor 450 and transmits control signals to the host computer as well. The polygon engine 410 and register file 415 couple to the host interface 405 via HIF bus signals, which couple to the register file 415 via 32-bit input signals. The polygon engine 410 feeds address and control signals to the register file 415 and receives data signals from the register file 415. The polygon engine 410 sends pixel coordinates and characteristic values to a pixel pipe 420 via output signals. The pixel pipe 420 uses known techniques to combine the pixel coordinates and characteristic values into pixel information suitable for rendering onto a graphics display. The pixel pipe 420 then transmits the pixel information to the memory controller 425 via pixel_data signals.

The memory controller 425 and display controller 426 couple to the RAC 428 via a Rambus™ Interface (RIF) bus 427. The RAC 428 is adapted to transact memory reads and writes to the RDRAM 430 over the Rambus™ 431. It should be understood, however, that any suitable type of memory technology and, such as dynamic random access memory (DRAM), synchronous DRAM, or extended data output DRAM, may be substituted for the RDAM 430, along with a suitable bus protocol replacement for the Rambus™ 431. Upon receiving the pixel data from the pixel pipe 420, the memory controller 425 writes the pixel data the memory device 430 by passing the pixel data to the RAC 428 via the RIF bus 427. The display controller 426 generates the appropriate signals to drive the display 435 based on the pixel values defined by the pixel pipe. These pixel values are stored in the RDRAM 430, as described above. The display controller, therefore, also accesses the memory device 430 over the RIF bus 427 via the RAC 428. The memory controller 425 and display controller 426 must therefore share the RIF bus 427 and may use any suitable arbitration protocol. To ensure timely rendering, however, the display controller 426 preferably has priority of the memory controller 425 for use of the RIF bus 427.

The register file 415 generally comprises a bank of registers adapted to store the polygon parameters which are received from the host computer. Table I illustrates a preferred embodiment of the structure of register file 415. The first column of Table I identifies the registers which hold the polygon parameters. The second and third columns provide a description and recommended format, respectively, for the register values. In the Format column, an "I.F" value indicates that the register contents hold an I-bit integer and an F-bit fractional. Hence, an "I.F"—formatted register holds I+F bits. Also in the Format column, an 'x' indicates a reserved portion of the register, and an 's' denotes a sign bit portion of the integer value. The Address Offset column, written in hexadecimal notation, describes the addresses of the registers within the register file. The register file is preferably loaded by the software driver in order, from Address Offset 0h to Address Offset FCh.

TABLE I

Preferred structure of register file 415.

| Register Name | Description | Format | Address Offset |
|---|---|---|---|
| $X_M$ | initial x-coordinate | 11.16 | 0h |
| $Y_M$ | initial y-coordinate | 11.16 | 4h |
| $R_M$ | initial red color | 8.16 | 8h |
| $G_M$ | initial green color | 8.16 | Ch |
| $B_M$ | initial blue color | 8.16 | 10h |
| $\Delta X_M$ | delta X main | 12.16 | 14h |
| main count | polygon 1 height | x.11 | 18h |
| opp count | polygon 2 height | x.11 | 1Ah |
| $W_M$ | initial width for polygon 1 | 11.16 | 1Ch |
| $W_O$ | initial width for polygon 2 | 11.16 | 20h |
| $\Delta W_M$ | polygon 1 delta width | s.12.16 | 24h |
| $\Delta W_O$ | polygon 2 delta width | s.12.16 | 28h |
| $\Delta R_M$ | red delta main | s.9.16 | 2Ch |
| $\Delta G_M$ | green delta main | s.9.16 | 30h |
| $\Delta B_M$ | blue delta main | s.9.16 | 34h |
| $\Delta R_O$ | delta red ortho | s.9.16 | 38h |
| $\Delta G_O$ | delta green ortho | s.9.16 | 3Ch |
| $\Delta B_O$ | delta blue ortho | s.9.16 | 40h |
| $Z_M$ | initial z-coordinate | s.16.16 | 44h |
| $\Delta Z_M$ | delta Z main | s.16.16 | 48h |
| $\Delta Z_O$ | z delta ortho | s.16.16 | 4Ch |
| $V_M$ | initial V value | s.10.16 | 50h |
| $U_M$ | initial U value | s.10.16 | 54h |
| $\Delta V_M$ | V delta main | s.10.16 | 58h |
| $\Delta U_M$ | U delta main | s.10.16 | 5Ch |
| $\Delta V_O$ | V delta ortho | s.10.16 | 60h |
| $\Delta U_O$ | U delta ortho | s.10.16 | 64h |
| $W_M$ | initial W value | s.10.16 | 68h |
| $\Delta W_M$ | W delta main | s.10.16 | 6Ch |
| $\Delta W_O$ | W delta ortho | s.10.16 | 70h |
| $V_{off}$ | V offset of nearest vertex | s.10.16 | 74h |
| $U_{off}$ | U offset of nearest vertex | s.10.16 | 78h |
| $F_M$ | initial fog value | 8.8 | 7Ch |
| $\Delta F_M$ | fog delta main | 8.8 | B4h |
| $\Delta F_O$ | fog delta ortho | 8.8 | B8h |
| $A_M$ | initial alpha value | 8.8 | C0h |
| $\Delta A_M$ | alpha delta main | s.9.8 | C4h |
| $\Delta A_O$ | alpha delta ortho | s.9.8 | C8h |
| $sR_M$ | initial specular red color | 8.16 | D0h |
| $sG_M$ | initial specular green color | 8.16 | D4h |
| $sB_M$ | initial specular blue color | 8.16 | D8h |
| $\Delta sR_M$ | specular red delta main | s.9.16 | DCh |
| $\Delta sG_M$ | specular green delta main | s.9.16 | E0h |
| $\Delta sB_M$ | specular blue delta main | s.9.16 | E4h |
| $\Delta sR_O$ | specular red delta ortho | s.9.16 | E8h |
| $\Delta sG_O$ | specular green delta ortho | s.9.16 | Ech |
| $\Delta sB_O$ | specular blue delta ortho | s.9.16 | F0h |
| Opcode | opcode for execution/polygon engine (includes $X_{DIR}$) | 32.0 | FCh |

Figure 1:
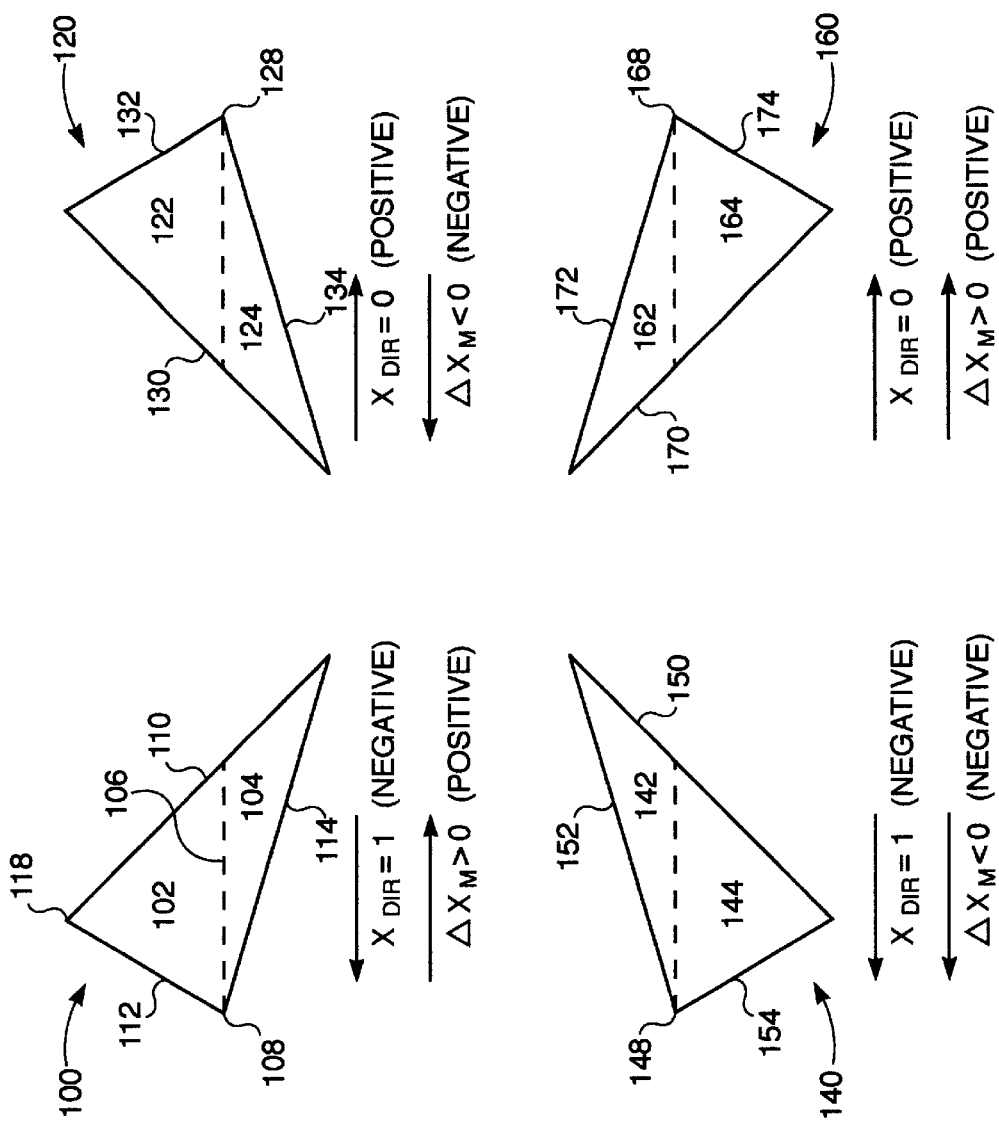
FIG. 1 is an exemplary diagram of the four types of random triangles.
Figure 2:
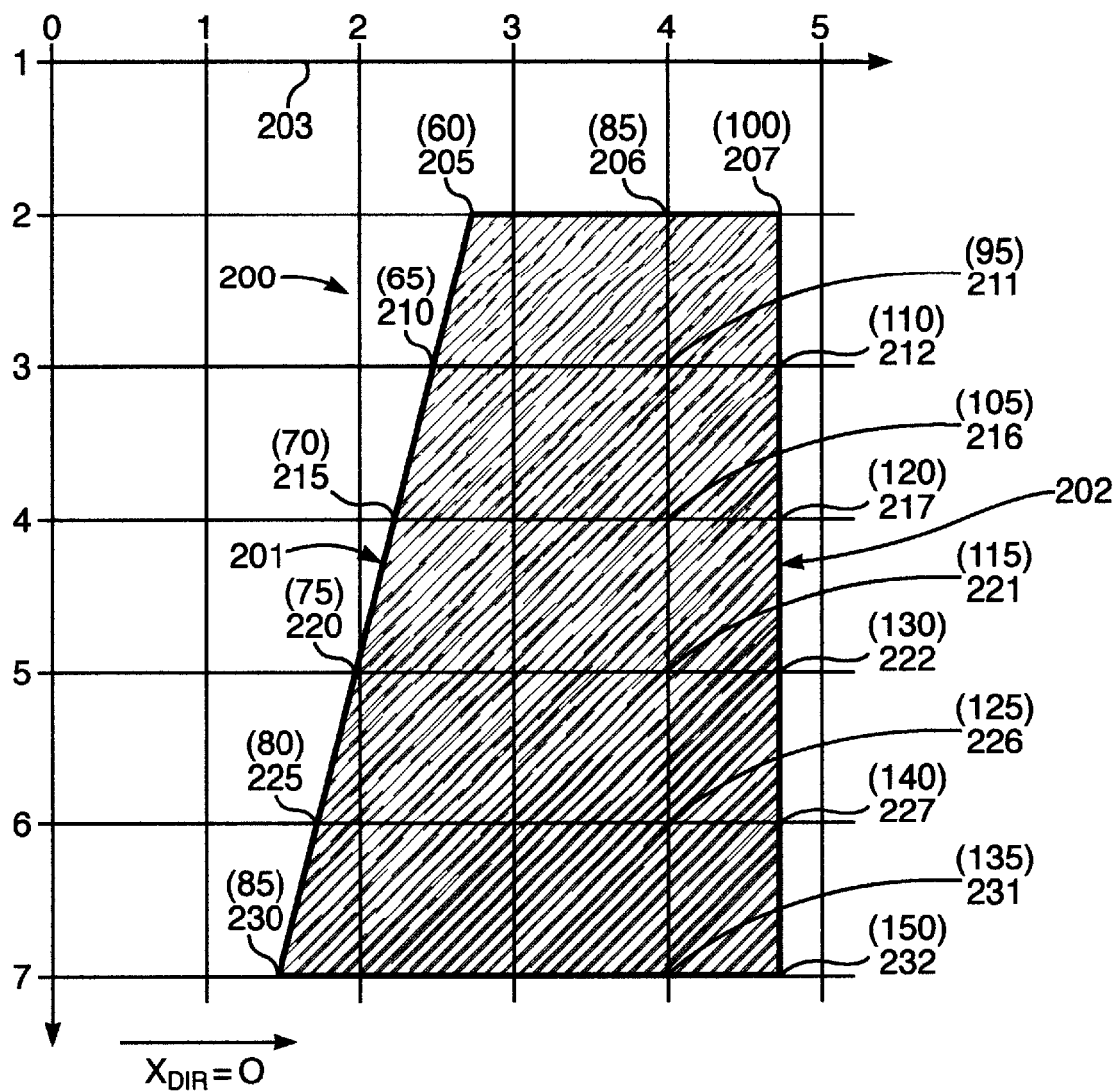
FIG. 2 is an example of a random quadrangle with monotonic shading.
Figure 3:
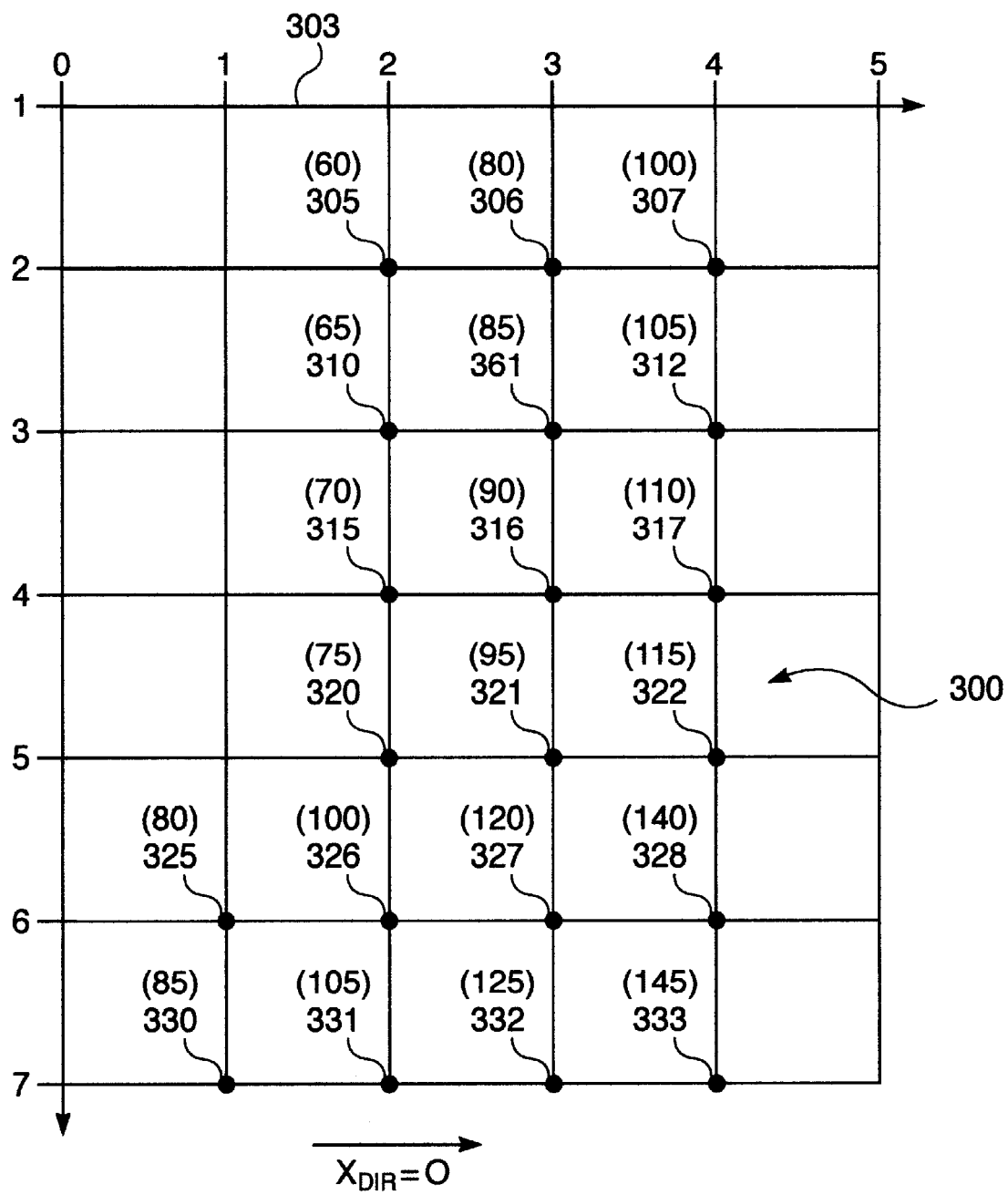
FIG. 3 is an example of a the random quadrangle of FIG. 2 rendered onto a pixel grid using an Incremental Line Drawing algorithm.

Graphics processor 450 preferably supports the rendering and error correction of color, specular lighting, depth, and texture-mapping pixel characteristics using an Incremental Line Drawing (ILD) algorithm. As discussed previously with respect to FIGS. 2 and 3, a polygon drawn using the ILD algorithm may exhibit visual aberrations such as banding or other types of distortion if no error correction is used. The source of this banding effect lies in the difference, or interpolation error, between the fractional-valued x-coordinates of polygon 300 and the integer-valued pixels which the graphics processor actually renders. In general, the interpolation error in the delta ortho gradient across any given scan line is directly proportional to the degree of rounding in the x-coordinates of the pixels on that scan line. For instance, the x-coordinates of the pixels on scan line 2 of FIG. 3 are rounded by ¾ of a pixel. Accordingly, the interpolation error is $¾*\Delta R_O=15$ red color values along scan line 2. Similarly, the x-coordinates of the pixels along scan line 3 are rounded by ½ of a pixel, resulting in an interpolation error of $½*\Delta R_O=10$ red color values. Also, the x-coordinates of the pixels along scan line 4 are rounded by ¼ of a pixel, resulting in an interpolation error of $¼*\Delta R_O=5$ red color values. Because the pixels of scan line 5 were not rounded, the interpolation error along scan line 5 is $0*\Delta R_O=0$ red color values (i.e., line 5 has no interpolation error). The interpolation error along scan lines 6 and 7 is again proportional to the x-coordinate error, which is ¾ pixel for line 6 and ½ pixel for line 7.

Thus, the red color shift of the pixels in polygon 300 generally changes linearly between each scan line and in proportion to the degree of rounding in the x-coordinates. The present invention exploits this linearity property to perform error correction on the characteristic parameters and then renders the pixels using the corrected parameter values. Because all pixels in the polygon are rendered with error-corrected characteristic parameters, the scan lines containing no interpolation error are additionally "ortho-adjusted" by the associated delta ortho value to counteract the error correction, which is not needed for the pixels on these scan lines.

As discussed previously, interpolation error may occur with respect to any pixel characteristic applied to the rendered polygon. Because the error correction algorithm presented herein is applied in substantially the same manner to all pixel characteristics, a "generic" pixel characteristic "C" may be used in some examples and equations to illustrate the general method. It therefore should be understood that the "C" characteristic may be interpreted to mean any pixel characteristic, including red color, green color, blue color, specular red, specular green, specular blue, u-texel, v-texel, w-texel, alpha, fog, or any other pixel characteristic.

In the preferred embodiment, the graphics processor calculates corrected initial and delta main parameters for a generic pixel characteristic "C" according to the following equations:

$$C_{MEC}=C_M \pm \Delta C_O X_{MFRAC} \quad (1)$$

$$\Delta C_{MEC}=\Delta C_M \pm \Delta C_O * \Delta X_{MFRAC} \quad (2)$$

where $C_M$ is the uncorrected "C" starting value, $\Delta C_O$ is the "C" delta ortho value, $\Delta C_M$ is the uncorrected "C" delta main value, and $C_{MEC}$ and $\Delta C_{MEC}$ are the error-corrected "C" starting and "C" delta main parameters, respectively. The graphics processor preferably uses the addition operator in equations (1) and (2) if $X_{DIR}=1$ and uses the subtraction operator if $X_{DIR}=0$.

The graphics processor preferably ortho-adjusts selected main slope pixels by $\Delta C_O$, according to the value of $X_{DIR}$ and according to the change in the fractional x-coordinate values between successive scan lines. In general, and ortho-adjustment is required for main slope pixels not needing prior error correction (such as pixel 320 FIG. 3). A preferred embodiment calculates a final main slope characteristic value by adding $\Delta C_O$ or $-\Delta C_O$ to the preliminary main slope characteristic value whenever calculation of the x-coordinate of the current main slope pixel results in either a fractional carry or a fractional borrow and if the following logical expression is true:

$$(\Delta X_M<0)\text{XNOR}(X_{DIR}=1) \quad (3)$$

If calculation of the x-coordinate of the current main slope pixel results in either a factional carry or a fractional borrow and if expression (3) is false, however, then a preferred embodiment calculates a final main slope characteristic value by subtracting $\Delta C_O$ from the preliminary main slope characteristic value.

Thus, if calculating the current main slope x-coordinate results in a borrow or carry in the fractional x-coordinate and if expression (3) is true, then the graphics processor preferably calculates the current main slope characteristic parameter $C(i)$ from the previous main slope characteristic parameter $C(i-1)$ using equation (4):

$$C(i)=C(i-1)+C_M+\Delta C_O \quad (4)$$

If calculating the current main slope x-coordinate results in a borrow or carry in the fractional x-coordinate and if expression (3) is false, however, then the graphics processor preferably calculates the current main slope characteristic parameter $C(i)$ from the previous main slope characteristic parameter $C(i-1)$ using equation (5):

$$C(i)=C(i-1)+C_M-\Delta C_O \quad (5)$$

If $\Delta X_M$ is integer-valued (i.e., if $\Delta X_{MFRAC}=0$) or if calculating the current main slope x-coordinate does not result in a borrow or carry, then the graphics processor preferably calculates the current main slope characteristic parameter $C(i)$ from the previous main slope characteristic parameter $C(i-1)$ using equation (6):

$$C(i)=(i-1)+C_M \quad (6)$$

For instance, if $\Delta X_M$ is an integer, no ortho adjustments are necessary. If $\Delta X_M$ is not an integer, the graphics processor may first calculate a preliminary characteristic value for a main slope pixel by adding $\Delta C_M$ to the corresponding characteristic value of the previous main slope pixel. If $X_{DIR}=0$ and $\Delta X_M<0$ (as in triangle 120), the graphics processor preferably determines a final characteristic value by subtracting $\Delta C_O$ from the preliminary characteristic value of the current main slope pixel if calculating the current x-coordinate requires a borrow in the fractional portion of the previous x-coordinate. For example, the x-coordinate of main slope pixel 320 is 2.00. To calculate the x-coordinate for the next main slope pixel 325 requires the graphics processor to perform a subtraction of $|\Delta X_M|$, or 0.25, from 2.00, necessitating a borrow by the fractional portion of 2.00 from the integer portion of 2.00. Thus, a preferred embodiment of a graphics processor rendering polygon 300 preferably subtracts $\Delta R_O$ from the preliminary red color value of pixel 325, resulting in a final red color 65 for pixel 325. This and other error-corrections calculations will become clear with respect to FIG. 6, below.

If $X_{DIR}=0$ and $\Delta X_M>0$ (as in triangle 160), the graphics processor preferably determines a final characteristic value by adding $\Delta R_O$ to the preliminary red color of the current main slope pixel if calculating the current x-coordinate results in a carry of the fractional portion of the x-coordinates during addition. For instance, if a starting main slope pixel has x-coordinate =1.75, $X_{DIR}$=0, and $\Delta X_M$=+0.25, then the following main slope pixel will have x-coordinate 1.75+0.25=2.00. Because adding 1.75 to 0.25 requires carrying a value across the radix point (which is a decimal point in the present example but is a binary point in a preferred embodiment), the graphics processor preferably adds $\Delta R_O$ to the preliminary characteristic value of the main slope pixel on the following scan line.

If $X_{DIR}$=1 and $\Delta X_M$<0 (as in triangle 140), the graphics processor preferably determines a final characteristic value by adding $\Delta R_O$ to the preliminary characteristic value of the current main slope pixel if calculating the current x-coordinate requires a borrow in the fractional portion of the previous x-coordinate. For instance, if a main slope pixel has x-coordinate =2.00, $X_{DIR}$=1, and $\Delta X_M$=-0.25, then the following main slope pixel will have x-coordinate 2.00-0.25=1.75. Because subtracting 1.75 from 2.00 requires a borrow by the fractional portion of 2.00 from the integer portion of 2.00, the graphics processor preferably adds $\Delta R_O$ to the preliminary characteristic value of the main slope pixel on the following scan line.

If $X_{DIR}$=1 and $\Delta X_M$>0 (as in triangle 100), the graphics processor preferably determines a final characteristic value by subtracting $\Delta R_O$ from the preliminary characteristic value of the current main slope pixel if calculating the current x-coordinate results in a carry of the fractional portion of the x-coordinates during addition. For instance, if the main slope pixel of a first scan line has x-coordinate 1.75, $X_{DIR}$=0, and $\Delta X_M$=+0.25, then the main slope pixel on the second scan line will have x-coordinate 1.75+0.25=2.00. Because adding 1.75 to 0.25 requires carrying a value across the radix point, the graphics processor preferably subtracts $\Delta R_O$ from the preliminary characteristic value of the main slope pixel on the second scan line.

Figure 5:
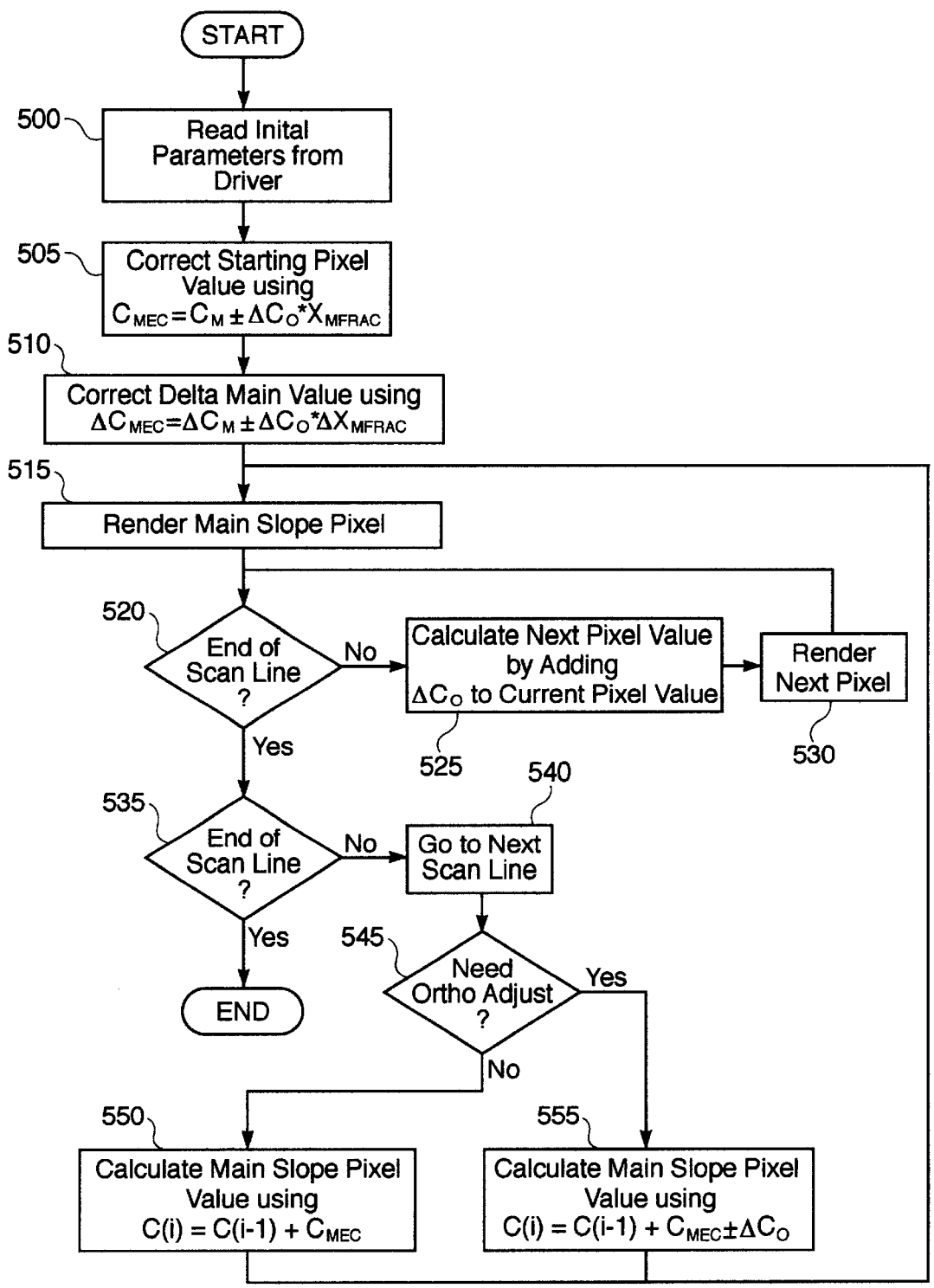
FIG. 5 is a flowchart of the Incremental Line-Drawing algorithm with error correction in accordance with the preferred embodiment.

FIG. 5 illustrates a flowchart of the steps used to render error-corrected pixels onto a pixel grid using the equations above. Beginning with step 500, the graphics processor 450 receives the starting characteristic parameters from the software driver. As described above, these parameters preferably include the initial x-coordinate $X_M$, initial y-coordinate $Y_M$, delta x main parameter $\Delta X_M$, x width parameter $W_M$, delta x width parameter $\Delta W_M$, polygon height, rendering direction $X_{DIR}$, and the starting, delta main, and delta ortho characteristic parameters for each type of pixel characteristic. Preferably, these parameters are stored in the register file 415.

Moving next to step 505, the graphics processor 450 corrects the starting parameter of each pixel characteristic ($C_{MEC}$) using equation (1). The processor 450 then replaces each uncorrected pixel characteristic ($C_M$) with the error-corrected pixel characteristic ($C_{MEC}$) in the register file 415. Next in step 510, the graphics processor 450 corrects the delta main value of each pixel characteristic ($\Delta C_M$) using equation (2) and replaces the uncorrected characteristic value ($\Delta C_M$) with the corrected characteristic value ($\Delta C_{MEC}$) in the register file 415.

The processor 450 next proceeds to step 515, which represents the first step for rendering each scan line of the polygon. If the graphics processor 450 is rendering the first scan line during step 515, then the characteristic value for the main slope pixel is $C_{MEC}$, as computed in step 505. If the graphics processor is rendering a subsequent scan line, then the main slope characteristic value will have been computed as in step 550 or 555, as described below.

Next moving to step 520, the graphics processor determines whether or not the main slope pixel is at the end of a scan line, which will occur if the main slope pixel is the only pixel on the scan line. If the main slope pixel is not at the end of the scan line, then the processor moves to step 525 to render the next pixel on the same scan line. In step 525, the characteristic value of the next pixel of the same scan line is calculated by adding $\Delta C_O$ to the current characteristic value. Next in step 530, the pixel is rendered onto the display 435, and the graphics processor 450 again moves to step 520 to determine whether the current pixel is at the end of the scan line. If the current pixel is the last pixel on the scan line in step 520, then the processor 450 moves to step 535.

In step 535, the processor determines whether or not the final scan line has just been rendered in steps 515 through 530. If the final scan line has been rendered, then the processor moves to the "end" block. If the final scan line has not yet been rendered, then the processor 450 moves to the next scan line in step 540.

Next in steps 545, 550, and 555, the graphics processor 450 calculates the characteristic value of the main slope pixel. Beginning with step 545, the processor 450 determines whether or not the main slope pixel need to be ortho-adjusted. As described above, the main slope pixel will need to be ortho-adjusted if calculating the current main slope characteristic value will require a borrow or carry in the fractional portion of the characteristic value. If the main slope pixel does not need to be ortho-adjusted, then the processor in step 550 calculates the characteristic value of the main slope pixel using equation (6). If the main slope pixel does need to be ortho-adjusted, however, then the processor moves to step 555 and calculates the main slope characteristic value using equations (4) and (5). As described above, the processor 450 uses equation (4) in step 555 if equation (3) is true. If equation (3) is false, then the processor 450 uses equation (5) in step 555. From steps 550 and 555, the graphics processor returns to step 515 to begin rendering a new scan line.

From examining FIG. 5 in detail, it should be noted that blocks 500, 505, and 510 essentially comprise the error correction steps of the present invention, since the remaining steps are directed mainly toward rendering the polygon. The error correction steps of blocks 500, 505, and 510 therefore may be thought of as "error prevention" steps, since correcting the parameters before rendering the polygon eliminates the need for error correction after rendering. By avoiding error correction post rendering, the present invention may be implemented using simpler and faster components and algorithms.

Figure 6:
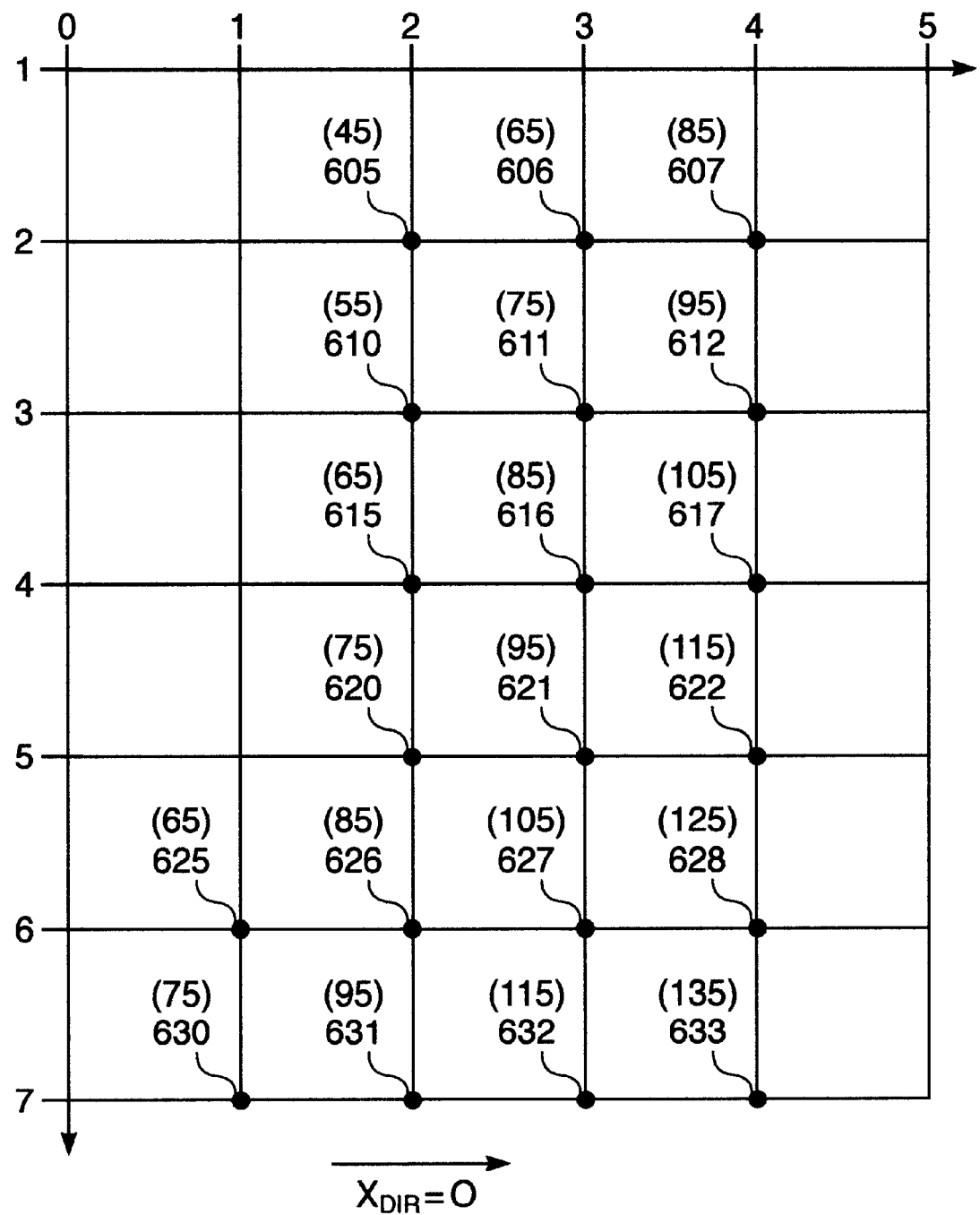
FIG. 6 is a preferred embodiment of the random quadrangle of FIG. 2 rendered onto a pixel grid using error-correction.

FIG. 6 illustrates an error-corrected version of polygon 200 rendered onto a pixel grid by graphics processor 450. The graphics processor 450 receives parameters $X_M$=2.75, $Y_M$=2, $X_{DIR}$=0, $W_M$=+2.0, $\Delta W_M$=+0.25, $\Delta X_M$=-0.25, $R_M$=60, $\Delta R_O$=20, $\Delta R_M$=5, and polygon height=6 pixels, as in the previous example. Before rendering polygon 400, however, the preferred graphics processor corrects the red characteristic parameters $R_M$ and $\Delta R_O$ according to equations (7) and (8), which follow from equations (1) and (2), respectively:

$$R_{MEC}=R_M-\Delta R_O*X_{MFRAC}=45 \quad (7)$$

$$\Delta R_{MEC}=\Delta R_M-\Delta R_M*\Delta X_{MFRAC}=10 \quad (8)$$

As in the example of FIG. 3, the graphics processor determines the x-coordinate of pixel 605 by rounding $X_M$ down to the nearest integer. Thus, (x, y)=(2, 2) for pixel 605. From equation (7) the red color intensity for initial pixel 605 is $R_{MEC}$=45. Because $X_{DIR}$0, the graphics engine renders the remaining pixels of the initial scan line 2 in the positive direction. Since the initial scan line width is $W_M$=2.0, the graphics engine renders pixels 606 and 607 to complete scan line 2. The graphics processor determines the red color values for pixels 606 and 607 by adding $\Delta R_O$ to each of the preceding pixels. Thus, pixel 606 has a red color value of 65, and pixel 607 has a red color value of 85.

After the initial scan line is completed, the graphics processor computes the next main slope pixel x-coordinate as 2.75−0.25=2.50, drawing pixel 610 at (x, y)=(2, 3) as in the previous example. The red color value for pixel 610 may be determined by adding $R_{MEC}$=10 to the red value for the previous main slope pixel 605. Thus, pixel 610 has color 55. The remaining pixels values and red intensities along scan line 3 are determined likewise, $\Delta R_O$=20 governing the color gradient between pixels. Hence, pixels 611 and 612 have red color intensities 75 and 95, respectively. The graphics processor continues to compute the pixel coordinates and red color values in this manner, rendering each of the pixels along scan lines 4 and 5. Accordingly, main slope pixels are assigned red color values of 65 (pixel 615) and 75 (pixel 620). Remaining pixels along scan line 4 have red colors 85 (pixel 616) and 105 (pixel 617), while remaining pixels along scan line 5 have red colors 95 (pixel 621) and 115 (pixel 622).

Since the x-coordinate of the main slope pixel 620 of line 5 is 2.00, the x-coordinate of main slope pixel 625 of line 6 is 2.00+$\Delta X_M$=1.75. The graphics processor again rounds the x-coordinate down to (x, y)=(1, 5) to draw pixel 625. As with previous main slope pixels, the graphics processor determines a preliminary red color value by adding $\Delta R_{MEC}$ to the red value of the previous main slope pixel 620. Thus, pixel 625 has color 75+$\Delta R_{MEC}$=85. Because subtracting 0.25 from 2.00 to compute the x-coordinate requires a borrow across the radix point of 2.00, however, the graphics processor must perform an ortho-adjust to pixel 625 by subtracting $\Delta R_O$ from the preliminary red color value of pixel 625. Thus, pixel 625 has a final red color intensity of 75+$\Delta R_{MEC}$−$\Delta R_O$=65. The graphics processor draws remaining pixels 626, 627, and 628 along scan line 6 as in previous examples, calculating each red color value by adding $\Delta R_O$ to the red color value of the preceding pixel. Thus the color values along scan line 6 become 85 (pixel 626), 105 (pixel 627), and 125 (pixel 628).

It is immediately apparent that polygon 400 has a smooth red color gradient throughout scan lines 2 through 6, in contrast with polygon 300. As in the example of FIG. 3, the color difference between each consecutive pixel on a given scan line equals $\Delta R_O$, or 20. In contrast to the example of FIG. 3, the red color gradient along any pixel column equals a constant value of 10 in polygon 400. For instance, the pixels along column 4 have red color intensities 85 (pixel 607), 95 (pixel 612), 105 (pixel 617), 115 (pixel 622), and 125 (pixel 628). Pixels in columns 2, 3, and 4 also exhibit a smooth, even red color gradient.

Continuing to render the final scan line 7, the graphics processor draws main slope pixel 630 by calculating from the previous main slope x-coordinate a new x-coordinate of 2.5. Rounding down, the graphics processor draws new main slope pixel 630 at (x, y)=(2, 7). The graphics processor determines the red color value for pixel 630 by adding $\Delta R_M$ to the red color value of pixel 625. Thus, pixel 630 receives red color 65+$\Delta R_M$=75. The graphics processor draws remaining pixels along scan line 7, determining each new color value by adding $\Delta R_O$ to each previous pixel color. Thus, pixel 631 has red color 95, pixel 632 has red color 115, and pixel 633 has red color 135. Again, the pixels along scan line 7 differ in red color intensity from the pixels of scan line 6 by a constant value of 10. Hence, polygon 400 appears to have a smooth red color gradient throughout.

While the drawing technique above used red color as an example, the present invention applies substantially the same technique to calculate any pixel characteristic, including green or blue color, red, green, or blue specular lighting, depth, texture, fog, alpha blending, or any other pixel characteristic.

Figure 7:
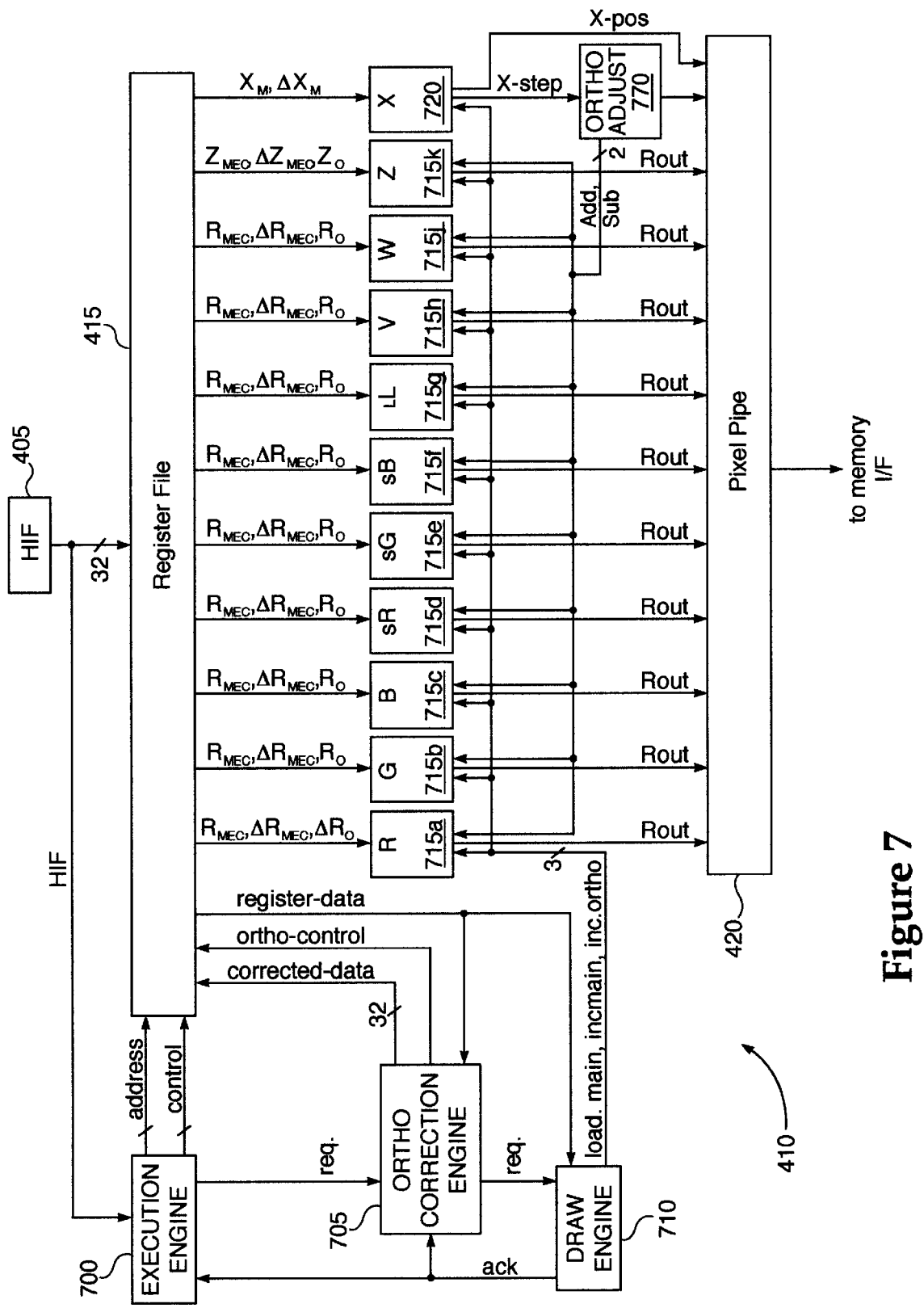
FIG. 7 is a block diagram of a preferred embodiment of the polygon engine of the graphics processor of FIG. 4.

Along with register file 415, the present invention can implemented entirely within the polygon engine 410, shown with greater detail in FIG. 7. The polygon engine 410 preferably comprises an execution engine 700, an ortho correction engine 705, a draw engine 710, an ortho adjust engine 770, and a plurality of interpolators 715. The interpolators include a red interpolator 715a, a green interpolator 715b, a blue interpolator 715c, a specular red interpolator 715d, a specular green interpolator 715e, and a specular blue interpolator 715f. Also included are interpolators for U, V, and W texture-mapping components, including a U interpolator 715g, a V interpolator 715h, and a W interpolator 715j. Finally, a preferred embodiment of graphics processor 410 includes a depth interpolator 715k and an X interpolator 720. Alternatively, the graphics processor 410 may include interpolators 715 (not shown) with substantially identical connections for other visual pixel characteristics such as fog and alpha blending. Because interpolators 715a, 715b, 715c, 715d, 715e, 715f, 715g, 715h, 715j, and 715k represent substantially similar components, they will be referred to collectively as interpolators 715.

The host interface 405 couples to the execution engine 700 and register file 415 via HEIF bus signals which transmit the polygon parameters and standard control signals from the host computer (not shown) to the register file 415. The execution engine 700 further couples to the register file 415 through address and control signals, which are used by the graphics processor 450 to read from and write to the register file 415. The execution engine 700 also transmits a request signal to the ortho correction engine 705 which indicates that the register file 415 holds uncorrected polygon parameters. The ortho correction engine 705 sends ortho__control signals to the register file 415 to request uncorrected polygon parameters such as main slope and delta main parameters. The register file 415 transmits these uncorrected parameters to the ortho correction engine 705 via register__data signals. In a similar manner, the ortho correction engine 705 transmits corrected polygon parameters to be stored into the register file 415 via corrected__data signals.

The ortho correction engine 705 additionally couples to the draw engine 710 via request signal to indicate that the current polygon parameters have been corrected in the register file 415. The draw engine transmits an acknowledge signal to the execution engine 700 and the ortho correction engine 705 to indicate that pixel rendering will commence. The draw engine further couples to the register file 415 via register__data signals to receive polygon parameters $X_M$, $\Delta X_M$, $W_M$, $\Delta W_M 1$, $\Delta W_M 2$, main__count, and opp__count. The draw engine transmits load__main, inc__main, and inc__ortho signals to the interpolators 715 and 720 to synchronize the interpolator calculations which will be described below in more detail with respect to FIGS. 8A, 8B, and 8C. The interpolators further receive error-corrected starting main slope values, delta main values, and delta ortho values from the register file 415. Similarly, the X interpolator receives a starting main slope x-coordinate $X_M$ and a delta X main value $\Delta X_M$ from the register file 415.

Controlled by the draw engine 710 via load_main, inc_main, and inc_ortho signals, the X interpolator sends an x-coordinate to the pixel pipe 420 via an xpos signal and transmits an xstep signal to the ortho adjust engine 770. The ortho adjust engine 770 further receives $\Delta X_{MFRAC}$ and x-direction $X_{DIR}$ (not shown), which, in conjunction with xstep, determines whether the interpolators should ortho-adjust the current main slope characteristic values. Accordingly, the ortho adjust unit 770 transmits either an add or a sub signal to the interpolators to indicate ortho addition or subtraction, respectively.

Still referring to FIG. 7, the interpolators 715 transmit pixel characteristics and coordinate values to combined in the pixel pipe 420 for pixel-rendering via Rout (red pixel value), Gout (green pixel value), Bout (blue pixel value), sRout (specular red pixel value), sGout (specular green pixel value), sBout (specular blue pixel value), Uout (U texture value), Vout (V texture value), Wout (W texture value), Zout (Z pixel coordinate), and xpos (X pixel coordinate) signals. The pixel pipe 420 combines these pixel values and couples to the memory controller 425 by standard methods.

Figure 8A:
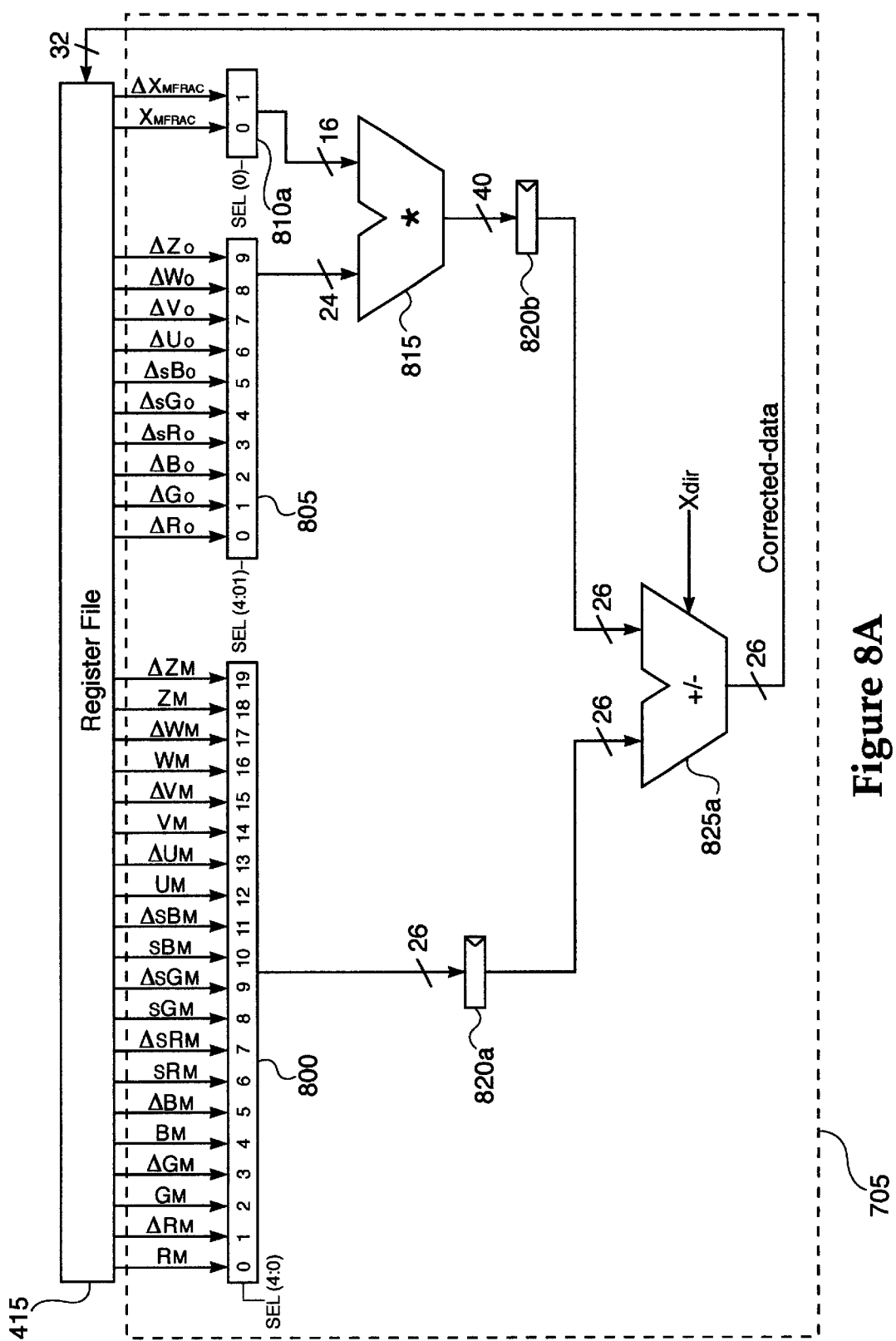
FIG. 8A is a block diagram of a preferred embodiment of the ortho correction engine of the polygon engine of FIG. 7.

Now referring to FIG. 8A, a preferred embodiment of an ortho correction engine 705 comprises a 20×1 multiplexer 800, a 10×1 multiplexer 805, a 2×1 multiplexer 810a, a multiplier 815, pipeline register s 820a and 820b, and an adder/subtractor 825a. The multiplexers 800, 805, and 810a couple to the outputs of register file 415 to receive uncorrected polygon parameters. Multiplexers 800 and 805 may contain additional, unused input terminals. In an alternative embodiment, however, these unused inputs may be connected register file 415 to support other types of pixel characteristics in substantially the same way as are the used inputs of the present example. The 32×1 multiplexer 800 receives starting parameters via register_data signals consisting of $R_M$ (red main), $G_M$ (green main), $B_M$ (blue main), $sR_M$ (specular red main), $sG_M$ (specular green main), $sB_M$ (specular blue main), $U_M$ (U texture main), $V_M$ (V texture main), $W_M$ (W texture main), and $Z_M$ (Z-depth main) and also receives corresponding delta main parameters $\Delta R_M$ (delta red main), $\Delta G_M$ (delta green main), $\Delta B_M$ (delta blue main), $\Delta sR_M$ (delta specular red main), $\Delta sG_M$ (delta specular green main), $\Delta sB_M$ (delta specular blue main), $\Delta U_M$ (delta U main), $\Delta V_M$ (delta V main), $\Delta W_M$ (delta W main), and $\Delta Z_M$ (delta Z main). The 10×1 multiplexer 805 receives delta ortho parameters $\Delta R_O$ (delta red ortho), $\Delta G_O$ (delta green ortho), $\Delta B_O$ (delta blue ortho), $\Delta sR_O$ (delta specular red ortho), $\Delta sG_O$ (delta specular green ortho), $\Delta sB_O$ (delta specular blue ortho), $\Delta U_O$ (delta U ortho), $\Delta V_O$ (delta V ortho), $\Delta W_O$ (delta W ortho), and $\Delta Z_O$ (delta Z ortho). Finally, the 2×1 multiplexer 810a receives $X_{MFRAC}$ and $\Delta X_{MFRAC}$ from register file 415.

The state of multiplexers 800, 805, and 810a are controlled by all or some of the select signals SEL[4:01]. All of the select signals, SEL[4:01], control the state of 20×1 multiplexer 800, selecting one input signal to multiplexer 800 to appear at the output of multiplexer 800. Similarly, select signals SEL[4:1] choose one input from 10×1 multiplexer 805 to appear on the output of multiplexer 805. Finally, SEL[0] determines which input of 2×1 multiplexer 810a is switched to the output of multiplexer 810a.

Multiplier 815 and adder/subtractor 825a implement the calculations of equations (1) and (2), above. Multiplexers 805 and 810a feed delta ortho operands and x-coordinate operands, respectively, to multiplier 815. The product of multiplier 815 is then fed into pipeline register 820b. Concurrently, 20×1 multiplexer 800 feeds either a starting parameter or a main parameter (as determined by SEL[4:0]) into pipeline register 820a. The outputs of pipeline registers 820a and 820b provide operands to adder/subtractor 825a, which also receives the binary signal $X_{DIR}$ indicating the rendering direction, as explained previously. If $X_{DIR}=0$, the adder/subtractor 825a adds the operands provided by pipeline register s 820a and 820b, while, if $X_{DIR}=1$, the adder/subtractor 825a subtract the operands provided by pipeline register s 820a and 820b. The adder/subtractor 825a sends the corrected parameter values via a corrected_data signal to register file 415.

It should be noted that the ortho correction engine 705 essentially calculates error-corrected parameters by adding an "error term" to each uncorrected parameter, where the absolute value of the error term is given by the product of multiplier 815 and the sign of the error term is given by rendering direction $X_{DIR}$. Thus, the error term can be defined as $\text{sgn}\{X_{DIR}\}*\Delta C_O*X_{MFRAC}$, where $\text{sgn}\{X_{DIR}\}=-1$ if $X_{DIR}=0$ (positive), and $\text{sgn}\{X_{DIR}\}=+1$ if $X_{DIR}=1$ (negative). For instance, to calculate an error-corrected starting parameter $C_{MEC}$, the ortho correction engine 705 adds either $+\Delta C_O*X_{MFRAC}$ or $-\Delta C_O*X_{MFRAC}$ to $C_M$, as given by equation (1). Accordingly, the $\pm\Delta C_O*X_{MFRAC}$ term constitutes the error term. Similarly, the ortho correction engine 705 adds the error term $\pm\Delta C_O*\Delta X_{MFRAC}$ to $\Delta C_M$ to calculate an error-corrected delta main parameter $\Delta C_{MEC}$. Note that the error terms as defined above always are directly proportional to either the fractional starting x-coordinate $X_{MFRAC}$ or the fractional delta X-main parameter $\Delta X_{MFRAC}$ and may be either positive or negative, as determined by the rendering direction $X_{DIR}$.

While the calculations of the ortho correction engine 705 would produce substantially the same calculations without pipeline registers 820a and 820b or with alternative pipeline register configurations, pipeline registers 820a and 820b are provided in the present embodiment to enable pipelining, a standard method of reducing calculation time in computer devices. For more information on pipelining, refer to *Computer Organization and Design* by Patterson and Hennessy (Morgan Kaufmann Publishers, Inc., 1994) and *VLSI Digital Signal Processors* by Madisetti (Butterworth-Heinmann, 1995).

To calculate the expression of equation (1), or $C_{MEC}=C_M\pm\Delta C_O*X_{MFRAC}$, SEL[0] is set to 0 so that 2×1 multiplexer 810a transmits $X_{MFRAC}$ to multiplier 815. Concurrently, SEL[4:1] selects a starting main parameter $C_M$, via 20×1 multiplexer 800, and a delta ortho parameter $\Delta C_O$, via 10×1 multiplexer 805. For example, to calculate a corrected value for the specular red starting parameter, or $sR_{MEC}=sR_M\pm\Delta sR_O*X_{MFRAC}$, SEL[4, 3, 2, 1,0]=[0, 0, 1, 1, 0] routes $sR_M$ to pipeline register 820a routes $\Delta sR_O$ and $X_{MFRAC}$ to the multiplier 815. After processing its operands, the multiplier 815 feeds the product $\Delta sR_O*X_{MFRAC}$ into pipeline register 820b. During the subsequent cycle, pipeline register s 820a and 820b feed the operands $sR_M$ and $\Delta sR_O*X_{MFRAC}$, respectively, to adder/subtractor 825a, which adds the operands if $X_{DIR}=1$ or subtracts the operands if $X_{DIR}=0$. The adder/subtractor 825a then feeds the resulting corrected specular red starting value $sR_{MEC}$ into the register file 415, overwriting the uncorrected specular red value $sR_M$ with the error-corrected specular red value $sR_{MEC}$.

To calculate the expression of equation (2), or $\Delta C_{MEC}=\Delta C_M\pm\Delta C_O*\Delta X_{MFRAC}$, SEL[0] is set to 1 so that 2×1 multiplexer 810a transmits $\Delta X_{MFRAC}$ to multiplier 815. Concurrently, SEL[4:1] selects a delta main parameter $\Delta C_M$, via 20×1 multiplexer 800, and a delta ortho parameter $\Delta C_O$, via 10×1 multiplexer 805. For example, to calculate a corrected value for the delta Z main parameter, or $\Delta Z_{MEC}=\Delta Z_M \pm \Delta Z_O * \Delta X_{MFRAC}$, SEL[4, 3, 2, 1, 0]=[1, 0, 0, 1, 1] routes $\Delta Z_M$ to pipeline register 820*a* routes $\Delta Z_O$ and $\Delta X_{MFRAC}$ to the multiplier 815. After processing its operands, the multiplier 815 feeds the product $\Delta Z_O * \Delta X_{MFRAC}$ into pipeline register 820*b*. During the subsequent cycle, pipeline registers 820*a* and 820*b* feed the operands $\Delta Z_M$ and $\Delta Z_O * \Delta X_{MFRAC}$, respectively, to adder/subtractor 825*a*, which adds the operands if $X_{DIR}=1$ or subtracts the operands if $X_{DIR}=0$. The adder/subtractor 825*a* then feeds the resulting corrected delta Z main value $\Delta Z_{MEC}$ into the register file 415, overwriting the uncorrected delta Z main value $\Delta Z_M$ with the error-corrected specular red value $\Delta Z_{MEC}$.

Figure 8B:
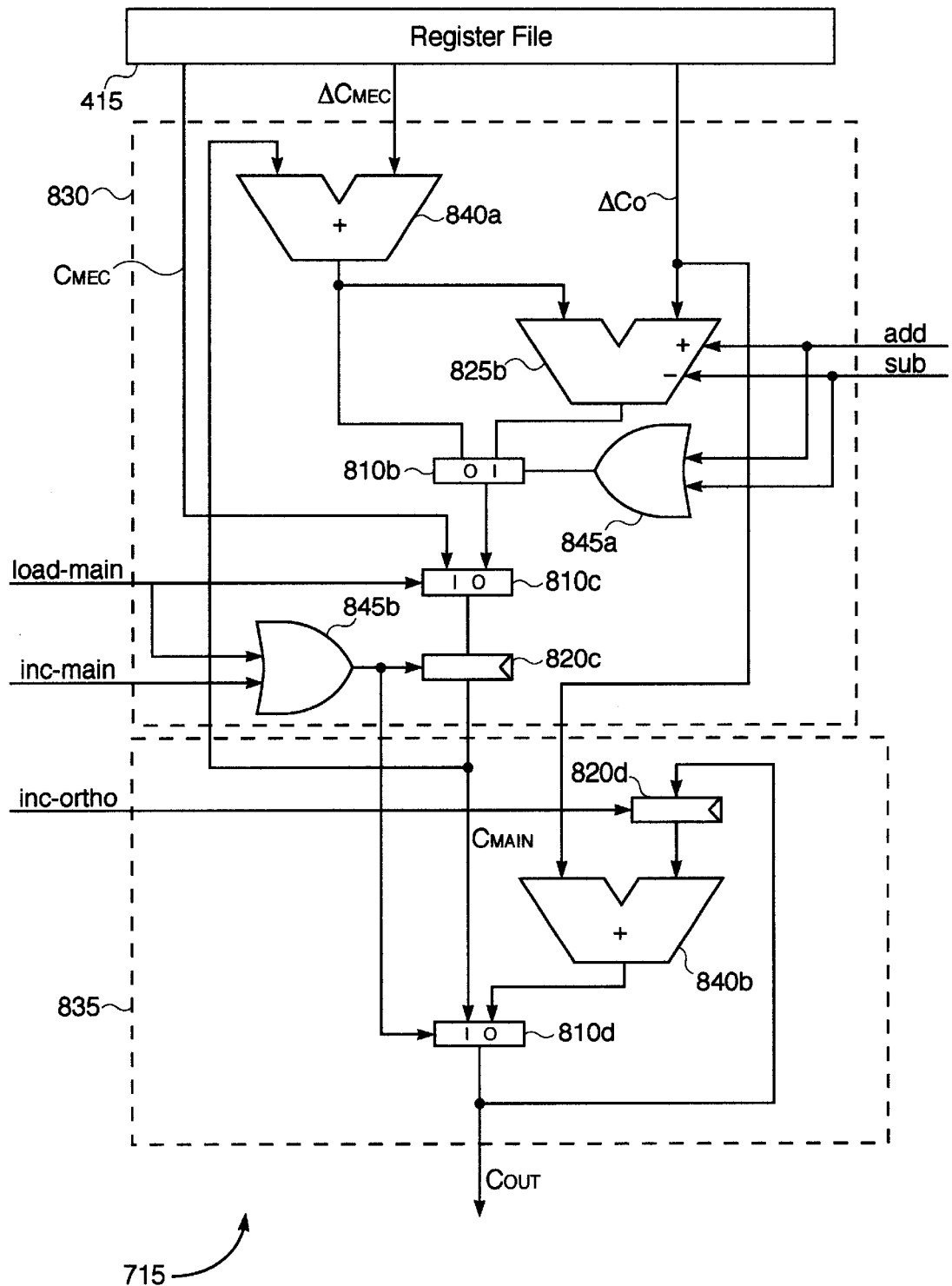
FIG. 8B is a block diagram of an interpolator from the polygon engine of FIG. 7.

Referring now to FIG. 8B, a preferred embodiment of an interpolator 715 includes a main slope interpolator 830 cascaded with an ortho interpolator 835. The main slope interpolator 830 calculates the characteristic values for pixels along the polygon main slope. The ortho interpolator 835 either transmits the main slope characteristic value directly (if the current pixel is the main slope pixel) or adds the delta ortho parameter to the current characteristic value (if the current pixel is not a main slope pixel). Main slope interpolator 830 includes an adder 840*a*, and adder/subtractor 825*b*, 2×1 multiplexers 810*b* and 810*c*, register 820*c*, and OR gates 845*a* and 845*b*. Adder 840*a* couples to the register file 415 to receive a delta main parameter, $\Delta C_{MEC}$, receiving ha second, feedback operand from the output of register 820*c*. The output of adder 840*a* feeds the adder/subtractor 825*b*, which receives a second operand, a delta ortho parameter $\Delta C_O$, from the register file 415. The adder/subtractor 825*b* adds its two input operands if the add signal is asserted or subtracts its two input operands if the sub signal is asserted. The ortho adjust unit generates the add and sub signals, as will be described with respect to FIG. 8C.

The adder 810*a* and adder/subtractor 825*b* feed 2×1 multiplexer 810*b*, and OR gate 845*a* controls the state of multiplexer 810*b*. If add is asserted or if sub is asserted, then the output of OR gate 845*a* is asserted, and multiplexer 810*b* selects the adder/subtractor 825*b* output. If neither add nor sub is asserted, then the OR gate 845*a* output is not asserted, and the multiplexer 810*b* selects the adder 840*a* output. Multiplexer 810*b* feeds the low ("0") input of multiplexer 810*c*, and the register file 415 feeds the high ("1") input to multiplexer 810*c*. The state of multiplexer 810*c* is controlled by the load main signal from the draw engine 710. The output of multiplexer 810*c* couples to the input of register 820*c*, and the output of OR gate 845*b* controls the state of register 820*c*. OR gate 845*b* receives input from the load_main and inc_main signals. Thus, if the draw engine 710 asserts either load_main or inc_main, then the output of OR gate 845*b* becomes asserted, and the $C_{MAIN}$ signal is set to the value at the input of register 820*c*.

When the load_main signal is asserted, multiplexer 810*c* and register 820*c* change $C_{MAIN}$ to $C_{MEC}$, which is the starting characteristic value. After loading the starting characteristic parameter $C_{MEC}$ is this manner, the load_main signal is deasserted. Subsequently, when neither the add signal nor the sub signal is asserted, the output of multiplexer 810*b* reflects the adder 840*a* output. Thus, the path from adder 840*a* through multiplexers 810*b* and 810*c* and register 820*c* cause the adder 840*a* to operate as an accumulator whenever inc_main is asserted, computing the next main slope value by adding $\Delta C_{MEC}$ to the current main slope value. To ortho adjust a main slope characteristic value as described with respect to the example of FIG. 6, the ortho adjust unit 770 causes the output of OR gate 845*a* to become asserted by asserting either the add or sub signal. When the output of OR gate 845*a* is asserted, multiplexer 810*b* selects the adder/subtractor 825*b* output. Because adder/subtractor 825 either adds delta ortho to or subtracts delta ortho from the current main slope pixel value (i.e., the output of multiplier 840*a*), the output of multiplexer 810*b* receives from adder/subtractor 825 the ortho-adjusted characteristic value, given by equation (4) or (5), respectively. In this manner, the main slope interpolator 830 computes the main slope characteristic values which provide input to the ortho interpolator 835 via the $C_{MAIN}$ signal.

Still referring to FIG. 8B, ortho interpolator 835 includes a 2×1 multiplexer 810*d*, a refer 820*d*, and an adder 840*b*. Multiplexer 810*d* selects $C_{MAIN}$ if OR gate 845*b* is asserted or the output of adder 840*b* if OR gate 845*b* is not asserted. Multiplexer 810*d* generates the output signal $C_{OUT}$, which both serves as the primary output of interpolator 715 and also provides a feedback input to register 820*d*. Register 820*d* provides one operand for adder 840*b* and is controlled by the inc_ortho signal. Adder 840*b* receives a second operand $\Delta C_O$ from the register file 415. After a main slope characteristic value $C_{MAIN}$ is produced by the main slope interpolator 830, inc_ortho is asserted for each pixel along the current scan line, so that ortho interpolator 835 calculates a characteristic value for each pixel.

Note that each interpolator 715*a*, 715*b*, 715*c*, 715*d*, 715*e*, 715*f*, 715*g*, 715*h*, 715*j*, and 715*k* essentially operates according to the apparatus of FIG. 8B. Thus, the input signals to interpolator 715, $C_{MEC}$, $\Delta C_{MEC}$, and $\Delta C_O$, correspond to the appropriate starting, delta main, and delta ortho inputs, respectively, of each interpolator 715*a*, 715*b*, 715*c*, 715*d*, 715*e*, 715*f*, 715*g*, 715*h*, 715*j*, and 715*k*. Accordingly, $C_{OUT}$ of FIG. 8B corresponds to any of the outputs $R_{OUT}$, $G_{OUT}$, $B_{OUT}$, $sR_{OUT}$, $sG_{OUT}$, $sB_{OUT}$, $U_{OUT}$, $V_{OUT}$, $W_{OUT}$, or $Z_{OUT}$ of FIG. 7.

Figure 8C:
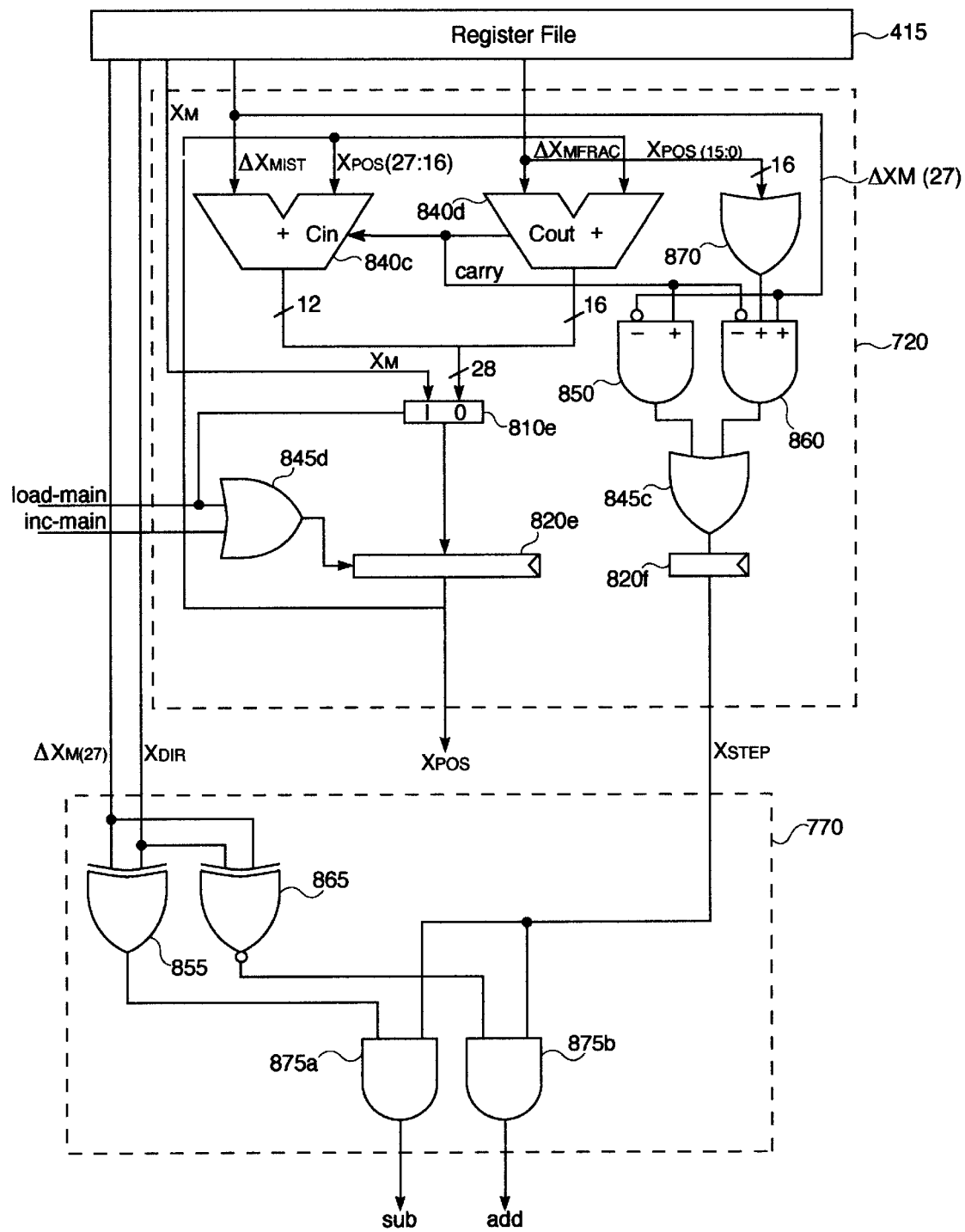
FIG. 8C is a block diagram of the X interpolator and ortho adjust engine of the polygon engine of FIG. 7.

Turning now to FIG. 8C, X interpolator 720 consists essentially of two adders 840*c* and 840*d* which connect to register file 415, 2×1 multiplexer 810*e*, OR gate 845*d*, and register 820*e*. X interpolator 720 also includes logic gates for generating the xstep signal, including OR gates 845*c* and 870, AND gates 850 and 860, and register 820*f*. Adder 840*c* preferably receives as one operand $\Delta X_{MINT}$ from the register file 415, while adder 840*d* preferably receives as one operand $\Delta X_{MFRAC}$ from the register file 415. The present embodiment preferably includes an x-coordinate having a 12-bit integer portion ($\Delta X_{MINT}$) and a 16-bit fractional ($\Delta X_{MFRAC}$), although alternative embodiments may include other bit-widths for different integer and fractional resolutions. Adder 840*c* further receives through its carry-in input a carry-out signal carry generated by adder 840*d*. Another preferred embodiment of X interpolator 720 (not shown) includes a single adder, in contrast to cascaded adders 840*c* and 840*d*, which accepts a first operand consisting of $\Delta X_{MINT}:\Delta X_{MFRAC}$.

The outputs of adders 840*c* and 840*d* are concatenated to feed a calculated x-coordinate to the low input ("0") of multiplexer 810*e*. The high input ("1") to multiplexer 810*e* is provided by the starting x-coordinate $X_M$ from the register file 415. Multiplexer 810*e* accepts its high input ("1") when load_main is asserted and accepts its low input when load_main is deasserted. The output of multiplexer 810*e* couples to register 820*e*, the state of which is controlled by the output of OR gate 845*d*, which receives inputs from inc_main and load_main. Thus, OR gate 845*d* is asserted if either inc_main or load_main is asserted, and is deasserted if neither inc_main or load_main is asserted. Register 820*e* provides the output signal xpos, which indicates the main slope x-coordinate of the current scan line. The most significant bits of xpos, which have a bit-width equivalent to that of $\Delta X_{MINT}$, provide the second operand for adder 840c. Accordingly, adder 840d receives a second operand from the least significant bits of xpos, which have a bit-width equivalent to that of $\Delta X_{MFRAC}$.

To render a polygon, the draw engine 710 first asserts the load_main signal, switching multiplexer 810e to the high ("1") input state and initializing the xpos signal to be equal to the starting x-coordinate $X_M$. Following the initialization of xpos, load_main is deasserted, and the adders 840c and 840d add $\Delta X_M$ to xpos. Thereafter, pulsing the inc_main signal causes register 820e to produce an updated main slope x-coordinate, as calculated by the adders 840c and 840d.

The logic circuitry used to generate the xstep output signal consists of OR gates 870 and 845c, AND gates 850 and 860, and register 820f. OR gate 870 accepts each bit of $\Delta X_{MFRAC}$ as input. Accordingly, the output to OR gate 870 is asserted high if at least one of the input signals is asserted high and is asserted low otherwise. Thus, OR gate 870 is asserted low if $\Delta X_M$ is an integer and is asserted high if $\Delta X_M$ is not an integer. AND gate 860 includes one inverting input (−) which is driven by the carry signal. AND gate 860 receives two additional signals through noninverting inputs (+), including one input from OR gate 870 and another input from the sign bit of $\Delta X_M$, or $\Delta X_{MINT}[27]$, in the register file 415. AND gate 850 includes one inverting input and one non-inverting input. The inverting input of AND gate 850 receives the sign bit of $\Delta X_M$, or $\Delta X_M[27]$, from register file 415 while the noninverting input receives the carry signal. The outputs of AND gates 850 and 860 drive OR gate 845c, which feeds register 820f. The output of register 820f comprises the xstep signal, which is asserted if either a borrow or carry condition occurs between adders 840c and 840d. Since adders 840c and 840d accumulate the integer and fractional portions of the x-coordinate, respectively, the xstep signal indicates the need for an ortho-adjustment in interpolators 715.

Still referring to FIG. 8C, a preferred embodiment of ortho adjust unit 770 includes XOR gate 855, XNOR gate 865, and AND gates 875a and 875b. XOR gate 855 and XNOR gate 865 receive identical inputs $X_{DIR}$ and $\Delta X_M[27]$ (the sign bit of $\Delta X_M$) and feed AND gates 875a and 875b, respectively. AND gates 875a and 875b receive second inputs from the xstep signal, generated by the X-interpolator 720. The resulting outputs of ortho adjust unit 770 are the sub (output of AND gate 875a) and add (output AND gate 875b) signals. Thus, asserting xstep causes either add or sub to become asserted, resulting in an ortho-adjustment to the pixel characteristic values calculated by the interpolators 715.

A polygon engine may also be implemented through software instructions that are executed via a microprocessor, a programmable graphics processor or other programmable device, or any other device capable of interpreting software instructions. Accordingly, FIGS. 9A through 9G illustrate flowcharts of a preferred embodiment of software instructions that implement a graphics processor. Further, the Microfiche appendix contains instructions written in the C programming language to implement the embodiment of FIGS. 9A through 9G. The software program of FIGS. 9A through 9G is intended to operate in substantially the same manner as the hardware embodiment of FIGS. 6, 8A, 8B, and 8C, and includes the error calculations of equations (1) through (6). The software embodiment of FIGS. 9A through 9G further define polygon parameters having bit widths equivalent to the bit widths of the corresponding parameters in the hardware embodiment, although alternative software embodiments may include polygon parameters comprising any number of bits. Further, the software embodiment is preferably capable of rendering both the upper and the lower polygon defining a random triangle or quadrangle. In addition, the software embodiment supports the pixel characteristics of fog and alpha blending.

Figure 9A:
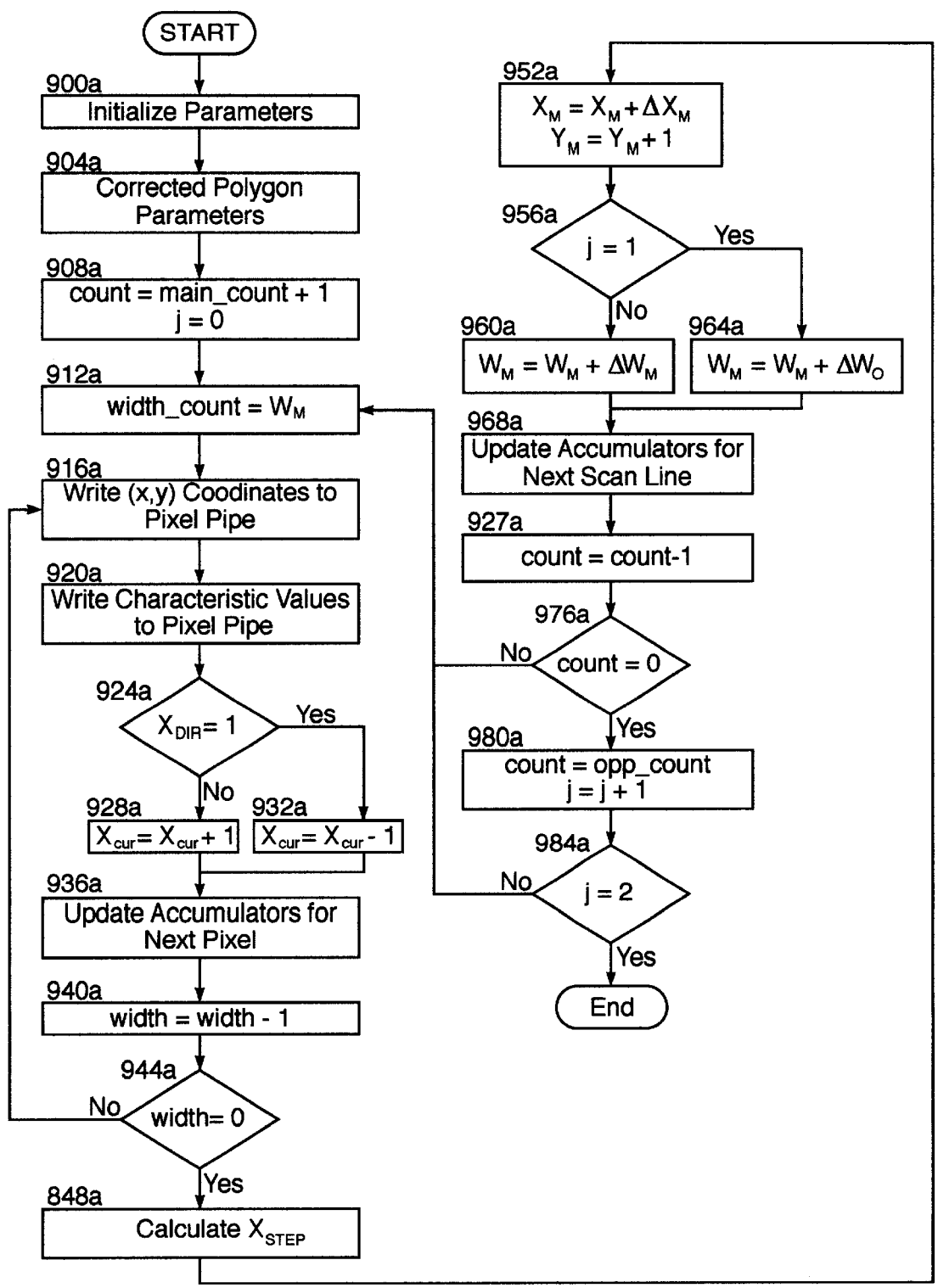
FIG. 9A is a flowchart of an algorithm for processing and error-correcting graphics pixels suitable for display onto a pixel grid.

Software execution in the present embodiment begins with the "start" block of the flowchart of FIG. 9A. In block 900a, the parameters defining a polygon, as listed in Table I, above, are initialized or accepted as program input. In addition, new variables are introduced to allow the x-coordinate and pixel characteristics to be rounded. As in the previous embodiment, the x-coordinate of a main slope pixel $X_M$ is calculated by adding $\Delta X_M$ to the previous main slope x-coordinate. Because $X_M$ is preferably a fractional-valued variable, an "X current" variable $X_{cur}$ is introduced in block 900a to represent the rounded value of the current main slope pixel x-coordinate $X_M$.

Since the characteristic values are rounded as well, a "C current" variable $C_{cur}$ and a "C ortho" variable $C_{ortho}$ for each pixel characteristic are also introduced in block 900a. The "C ortho" variable $C_{ortho}$ will be used to calculate the pixel characteristic values for pixels not on the main slope, allowing $C_M$ to hold the characteristic value of the main slope pixel. The "C current" variable $C_{cur}$ will be used to represent the rounded value of $C_{ortho}$, so that the current, unrounded, value of $C_{ortho}$ may be used to calculate a subsequent $C_{ortho}$. Accordingly, each type of pixel characteristic is assigned a "C ortho" and a "C current" variable. Table II summarizes the variables defined and initialized in block 900a that are not listed in Table I.

TABLE II

Additional program variables defined in block 900a.

| Variable | Description |
| --- | --- |
| $X_{cur}$ | current polygon x-coordinate |
| $A_M$ | Alpha main parameter |
| $A_O$ | Alpha ortho gradient parameter |
| $\Delta A_M$ | delta Alpha main |
| $A_{ortho}$ | Alpha ortho variable-holds current, unrounded Alpha value |
| $A_{cur}$ | Alpha current variable-holds current, rounded Alpha value |
| $F_M$ | Fog main parameter |
| $F_O$ | fog ortho parameter |
| $\Delta F_M$ | delta fog main |
| $F_{ortho}$ | fog ortho variable-holds current, unrounded fog value |
| $F_{cur}$ | fog current variable-holds current, rounded fog value |

TABLE II-continued

Additional program variables defined in block 900a.

| Variable | Description |
| --- | --- |
| $R_{ortho}$ | red ortho variable-holds current, unrounded red value |
| $R_{cur}$ | red current variable-holds current, rounded red value |
| $G_{ortho}$ | green ortho variable-holds current, unrounded green value |
| $G_{cur}$ | green current variable-holds current, rounded green value |
| $B_{ortho}$ | blue ortho variable-holds current, unrounded blue value |
| $B_{cur}$ | blue current variable-holds current, rounded blue value |
| $sR_{ortho}$ | specular red ortho variable-holds current, unrounded specular red value |
| $sR_{cur}$ | specular red current variable-holds current, rounded specular red value |
| $sG_{ortho}$ | specular green ortho variable-holds current, unrounded specular green value |
| $sG_{cur}$ | specular green current variable-holds current, rounded specular green value |
| $sB_{ortho}$ | specular blue ortho variable-holds current, unrounded specular blue value |
| $sB_{cur}$ | specular blue current variable-holds current, rounded specular blue value |
| $U_{ortho}$ | u-texel ortho variable-holds current, unrounded U texture value |
| $U_{cur}$ | u-texel current variable-holds current, rounded U texture value |
| $V_{ortho}$ | v-texel ortho variable-holds current, unrounded V texture value |
| $V_{cur}$ | v-texel current variable-holds current, rounded V texture value |
| $W_{ortho}$ | w-texel ortho variable-holds current, unrounded W texture value |
| $W_{cur}$ | w-texel current variable-holds current, rounded W texture value |
| $Z_{ortho}$ | Z ortho variable-holds current, unrounded z-coordinate |
| $Z_{cur}$ | Z current variable-holds current, rounded z-coordinate |

After the variables of Table I and Table II are initialized in block 900a, the program proceeds to block 904a to error-correct the $C_M$ and $\Delta C_M$ variables for each pixel characteristic, according to equations (1) and (2), above. A software algorithm implementing block 904a is presented in greater detail below with respect to FIGS. 9B and 9C, and it will be assumed for the remainder of the example of FIG. 9A that $C_M$ and $\Delta C_M$ represent error-corrected "C" main and "delta C main" parameters. Proceeding to block 908a, local integer variables count and j are introduced to track the position of loops within the algorithm of FIG. 9A. The variable count represents the rendering position with respect to the height of the current polygon and is initially defined as count=main_count+1. The variable count is decremented by one after each scan line, so that when count=0, the current polygon (i.e., either the upper or lower polygon) has been completely rendered. The value of j identifies whether the upper or lower polygon is being rendered and is initialized to j=0. The value of j is incremented after a polygon, either the upper or lower polygon, is rendered. Thus, when j=2, both the upper and lower polygon have been rendered. In the next block 912a, variable width_count is defined as width_count=$W_M$ and will be used in a manner similar to that of loop variables count and j, to count the number of pixels drawn on each scan line.

Moving to block 916a, the program writes the x- and y-coordinates, as defined by $X_{cur}$ and $Y_M$ to the pixel pipe. Any suitable algorithm may be used to implement the pixel pipe. In the next block 920a, the program writes the characteristic values to the pixel pipe, as defined by the $C_{cur}$ variables, $R_{cur}$, $G_{cur}$, $B_{cur}$, $sR_{cur}$, $sG_{cur}$, $sB_{cur}$, $U_{cur}$, $V_{cur}$, $W_{cur}$, $F_{cur}$, $A_{cur}$, and $Z_{cur}$.

Following block 920a, program execution proceeds to block 924a, where, if $X_{DIR}$=1, the program moves to block 932a to decrement $X_{cur}$ by one. If $X_{DIR}$=0 in block 924a, then the program increments X, by one in block 928a. Blocks 928a and 932a both feed block 936a, in which the interpolators for all pixel characteristics are updated. Block 936a is described in greater detail with respect to FIGS. 9D and 9E. From block 936a, the program moves to block 940a where width is decremented by one to mark the completion of the rendering of one pixel.

Since the variable width is decremented after every pixel is rendered, program execution next moves to block 944a to determine if width=0, which would indicate the end of a scan line. If width≠0, then the scan line has not been fully rendered, and program execution branches to block 916a to render the next pixel of the current scan line. If width=0, indicating that the final pixel of the scan line has been rendered, then the program proceeds to block 948a. In block 948a, xstep is calculated according to the same rules outlined with respect to FIG. 8C, above. Program execution next moves to block 952a, where $X_M$ is incremented by $\Delta X_M$, and $Y_M$ is incremented by one. Next moving to block 956a, program execution branches according to the value of j. If j=0 in block 956a, indicating that the upper polygon is being rendered, the program proceeds to block 960a and increments $W_M$ by $\Delta W_M$ for the next scan line. If j=1 in block 956a, indicating that the lower polygon is being rendered, the program proceeds to block 964a and increments $W_M$ by $\Delta W_O$ for the next scan line. Blocks 960a and 964a both lead to block 968a, in which the characteristic interpolators invoke equations (3) through (6) to compute the characteristic values for the main slope pixels of the next scan line. FIGS. 9F and 9G describe detailed procedures for updating the interpolators according to block 968a.

Subsequent to block 968a, program execution proceeds to block 972a, where count is decremented by one to mark the completion of a scan line. Decision block 976a follows block 972a and branches according to the state of count. Specifically, if count≠0 in block 976a, indicating that the final scan line of the current polygon has not been rendered, program execution returns to block 912a to begin rendering the next scan line. If count =0 in block 976a, indicating that the final scan line of the current polygon has been rendered, program execution proceeds to block 980a, where count is set equal to opp_count, and j is incremented by one. Following block 980a, decision block 984a branches according to the value of j. If j=1, indicating that the upper polygon has just been rendered, program execution branches to block 912a to begin rendering the lower polygon. If j=2 in block 976a, then the lower polygon rendering is complete, and program execution halts, terminating at the "end" block.

Figure 9B:
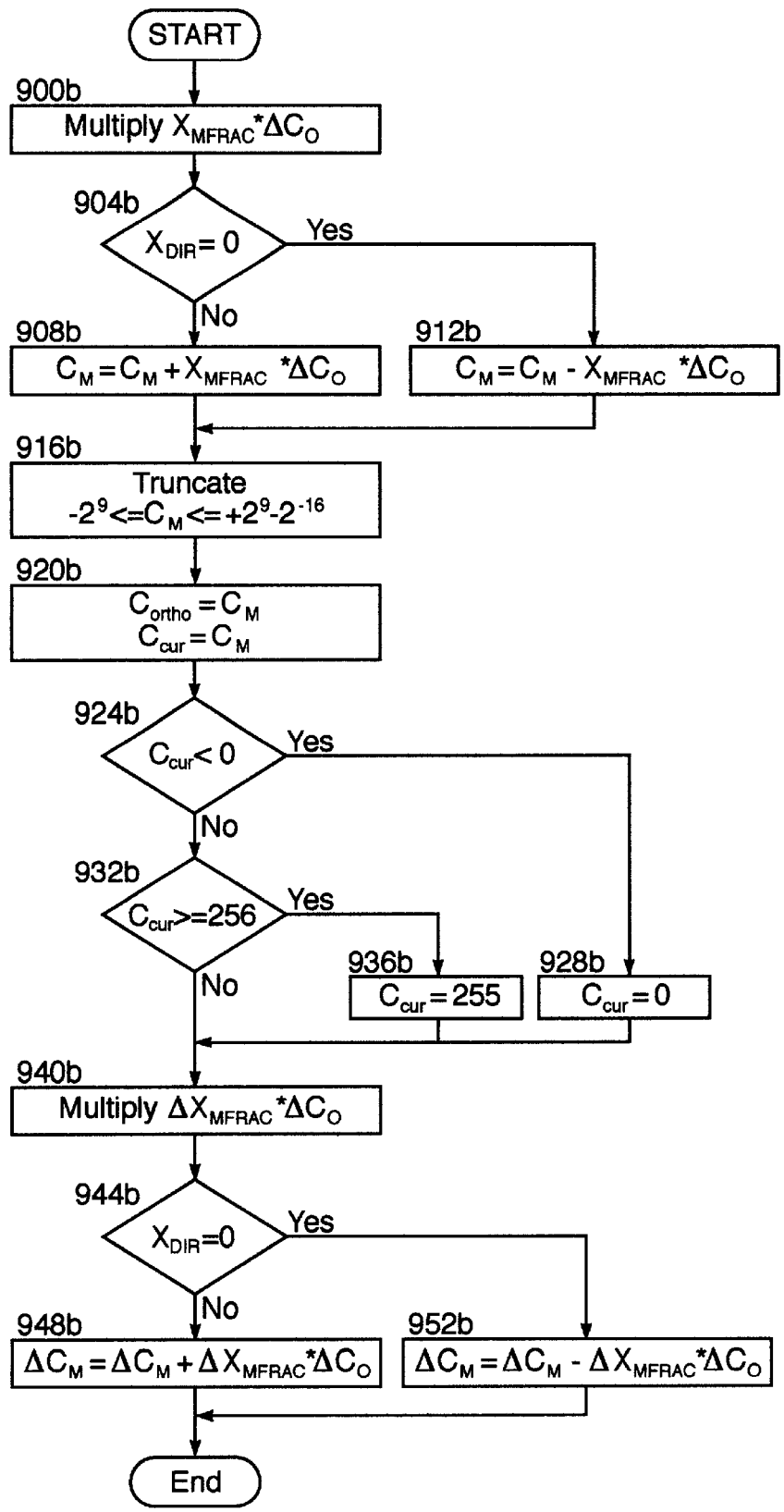
FIG. 9B is a flowchart of an error-correction program used in the algorithm of FIG. 9A for a pixel characteristic other than the z-coordinate.

FIG. 9B represents a preferred embodiment of an error-correction algorithm implementing equations (1) and (2), such the algorithm of block 904a in FIG. 9A. Although the steps of FIG. 9B are generally suitable for correcting parameters for any pixel characteristic, the Z-parameters preferably have longer bit-widths than do the other parameters and are preferably corrected according to the steps of FIG. 9C, as described below. Accordingly, FIG. 9B illustrates the steps for correcting the starting and delta main parameters for pixel characteristic "C," which may represent any pixel characteristic other than Z. The program of FIG. 9B is preferably invoked separately for each pixel characteristic.

Execution of the algorithm of FIG. 9B begins at the "start" block and proceeds immediately to block 900b. In block 900b, the fractional portion of $X_M$, or $X_{MFRAC}$, is multiplied by $\Delta C_O$. The product of block 900b is preferably represented by a two's complement number. Moving next to block 904b, if $X_{DIR}=0$, then the product of block 900b is used to calculate an updated $C_M$ in block 912b as $C_M - X_{MFRAC}^* \Delta C_O$, as in equation (1). If $X_{DIR}=1$ in block 904b, then the product of block 900b is used to calculate an updated $C_M$ in block 908b as $C_M + X_{MFRAC}^* \Delta C_O$.

Blocks 912b and 908b both lead to block 916b, where the most significant bits of $C_M$ are then truncated such that $C_M$ lies between −512 (or $-2^9$) and +512 (or $+2^9$). Specifically, $-2^9 \leq C_M \leq +2^9 - 2^{-16}$. In a preferred embodiment, $C_M$ has a 16-bit fractional portion but is represented by a 32-bit signed integer variable. Thus, $C_M$ is treated as a fixed-point number which is truncated in step 916b by keeping only a sufficient number of the least significant bits to retain the fractional portion (16 bits), the integer portion (9 bits), and the sign bit (1 bit), a total of 26 bits. "Truncation" as in step 916b therefore requires sign-extending $C_M$ from the sign bit (or the $26^{th}$ least significant bit) of $C_M$. To sign-extend $C_M$ in this manner, all bits to the left of the sign bit are set to the value of the sign bit. For a more detailed description of sign-extension and two's complement binary notation, refer to *Computer Organization and Design* by Patterson and Hennessy (Morgan Kaufmann Publishers, Inc., 1994).

After block 916b, $C_{ortho}$ and $C_{cur}$ are defined as $C_{ortho} = C_{cur} = C_M$ in block 920b. Because $C_{cur}$ represents a pixel characteristic value appropriate for rendering, $C_{cur}$ is next clipped, or saturated to lie between 0 and +255, as implemented with respect to blocks 924b, 928b, 932b, and 936b. Beginning with decision block 924b, the program flow branches according to the value of $C_{cur}$. If $C_{cur} < 0$, then $C_{cur}$ is set to zero in block 928b. If $C_{cur} \geq 0$ in block 924b, then the program moves to decision block 932b, which further branches program flow according to the value of $C_{cur}$. If $C_{cur} \geq 256$ in block 932b, then the program proceeds to block 936b, where $C_{cur}$ is set equal to 255. Otherwise, the program moves from block 932b to block 940b, without altering $C_{cur}$. Program flow from block 928b or block 932b also moves to block 940b. In block 940b, the program calculates the product $\Delta X_{MFRAC}^* \Delta C_O$, which is preferably represented by a two's complement number containing 40 significant bits, including the sign bit. Next continuing with block 944b, the program branches according to the value of $X_{DIR}$. Specifically, if $X_{DIR}=0$, program execution continues to block 948b, where the product of block 940b is used to calculate an updated $\Delta C_M$ as $C_M + \Delta X_{MFRAC}^* \Delta C_O$, as in equation (2). If $X_{DIR}=0$ in block 944b, then the product of block 940b is used to calculate $\Delta C_M$ in block 952b as $C_M - \Delta X_{MFRAC}^* \Delta C_O$. Blocks 952b and 948b represent the final stage of the algorithm of FIG. 9B and terminate at the "end" block.

Figure 9C:
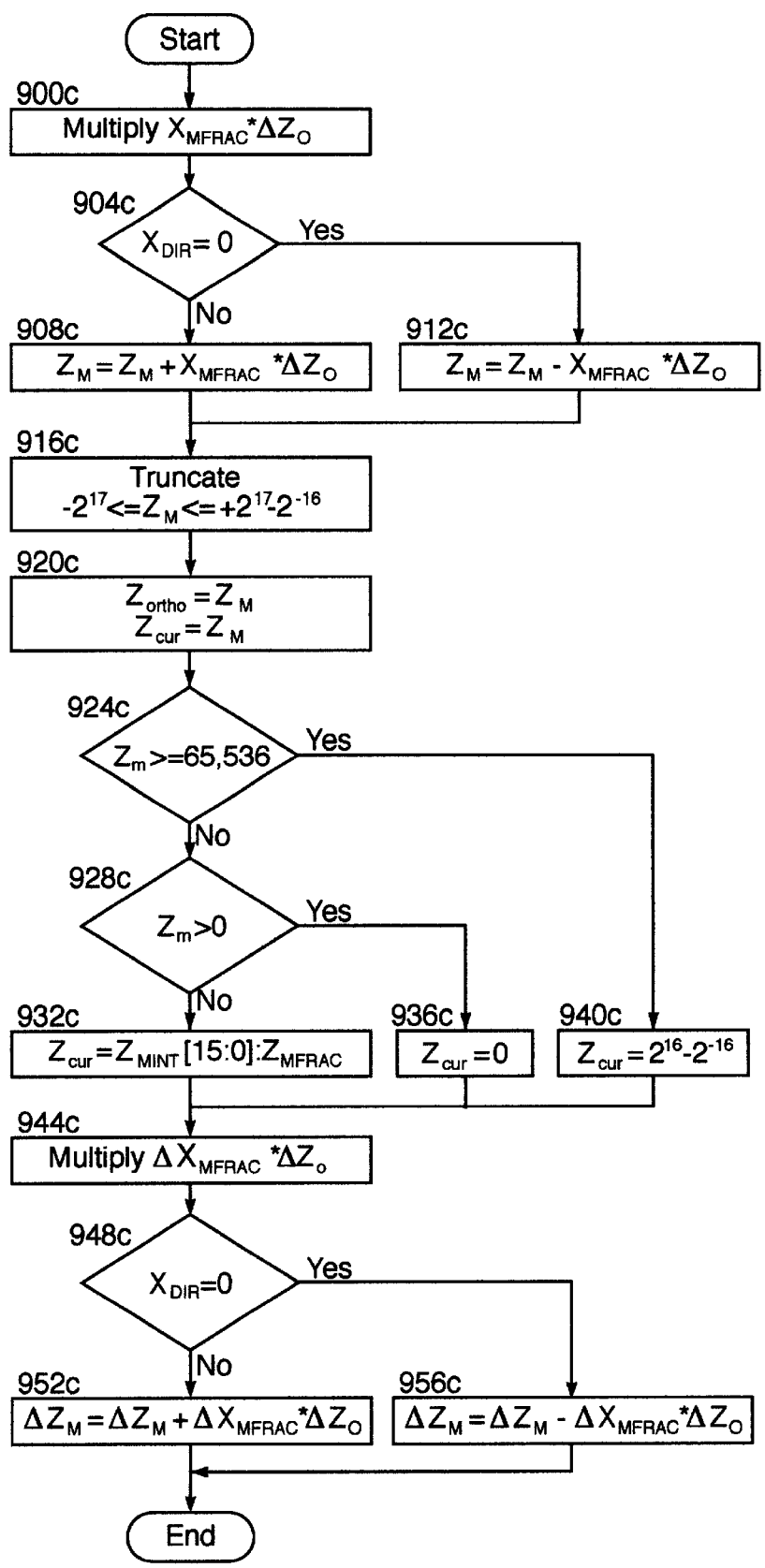
FIG. 9C is a flowchart of an error-correction program used in the algorithm of FIG. 9A for the z-coordinate pixel characteristic.

Now referring to FIG. 9C, a program for correcting $Z_M$ and $\Delta Z_M$ begins at the. "start" block, proceeding immediately to block 900b. In block 900c, the fractional portion of $X_M$, or $X_{MFRAC}$, is multiplied by $\Delta Z_O$. The product of block 900c preferably represents a two's complement number containing 40 significant bits, including the sign bit. Moving next to block 904c, if $X_{DIR}=0$, then the product of block 900c is used to calculate an updated $Z_M$ in block 912c as $Z_M - X_{MFRAC}^* \Delta Z_O$, from equation (1). If $X_{DIR}=1$ in block 904c, then the product of block 900c is used to calculate an updated $Z_M$ in block 908c as $Z_M + X_{MFRAC}^* \Delta Z_O$, using equation (1). The error-corrected $Z_M$, as calculated in either block 912c or 908c, preferably is represented by a two's complement number containing 48 significant bits, including the sign bit as the most significant bit. Block 912c and block 908c both lead to block 916c, in which the most significant bits of $Z_M$ are truncated such that $Z_M$ lies between −131,072 (or $-2^{17}$) and +131,072 (or $+2^{17}$). Specifically, $-2^{17} \leq Z_M \leq +2^{17} - 2^{-16}$. In a preferred embodiment, $Z_M$ has a 16-bit fractional portion and is represented by a 64-bit signed integer variable. Thus, $Z_M$ is treated as a fixed-point number which is truncated in step 916c by keeping only a sufficient number of bits to retain the fractional portion (16 bits), the integer portion (17 bits), and the sign bit (1 bit), a total of 48 bits. "Truncation" as in step 916c therefore requires sign-extending $Z_M$ from the $48^{th}$ least significant bit.

Still referring to FIG. 9C, the program next moves to block 920c, in which $Z_{ortho}$ and $Z_{cur}$ are defined as $Z_{ortho} = Z_M$ in block 920c. Because $Z_{cur}$ represents a pixel characteristic value appropriate for rendering, $Z_{cur}$ is next clipped, or saturated to lie between 0 and +65,536, as implemented with respect to blocks 924c, 928c, 932c, 936c, and 940c. Beginning with decision block 924c, the program flow branches according to the value of $Z_M$. If $Z_M \geq 65,536$ (or $+2^{16}$), then $Z_{cur}$ is set to $+2^{16} - 2^{-16}$ in block 940c. If $Z_M < 65,536$ in block 924c, then the program moves to decision block 928c, which further branches program flow according to the value of $Z_M$. If $Z_M < 0$ in block 928c, then the program proceeds to block 936c, in which $Z_{cur}$ is set to zero. Otherwise, the program moves from block 928c to block 932c, in which $Z_{cur}$ is set equal to the 32 least significant bits of $Z_M$, or $Z_{MINT}[15:0]:Z_{MFRAC}$.

Program flow from blocks 932c, 936c, and 940c feed block 944c. In block 944c, the program calculates the product $\Delta X_{MFRAC}^* \Delta Z_O$, which is preferably represented by a two's complement number containing 40 significant bits, including the sign bit. Next continuing with block 948c, the program branches according to the value of $X_{DIR}$. Specifically, if $X_{DIR}=0$, program execution continues to block 952c, where the product of block 944c is used to calculate an updated $\Delta Z_{MEC}$ as $Z_M + \Delta X_{MFRAC}^* \Delta Z_O$, using equation (2). If $X_{DIR}=0$ in block 948c, then the product of block 944c is used to calculate an updated $\Delta Z_M$ in block 956c as $Z_M - \Delta X_{MFRAC}^* \Delta Z_O$. Blocks 952c and 956c represent the final stage of the algorithm of FIG. 9C and terminate at the "end" block.

Figure 9D:
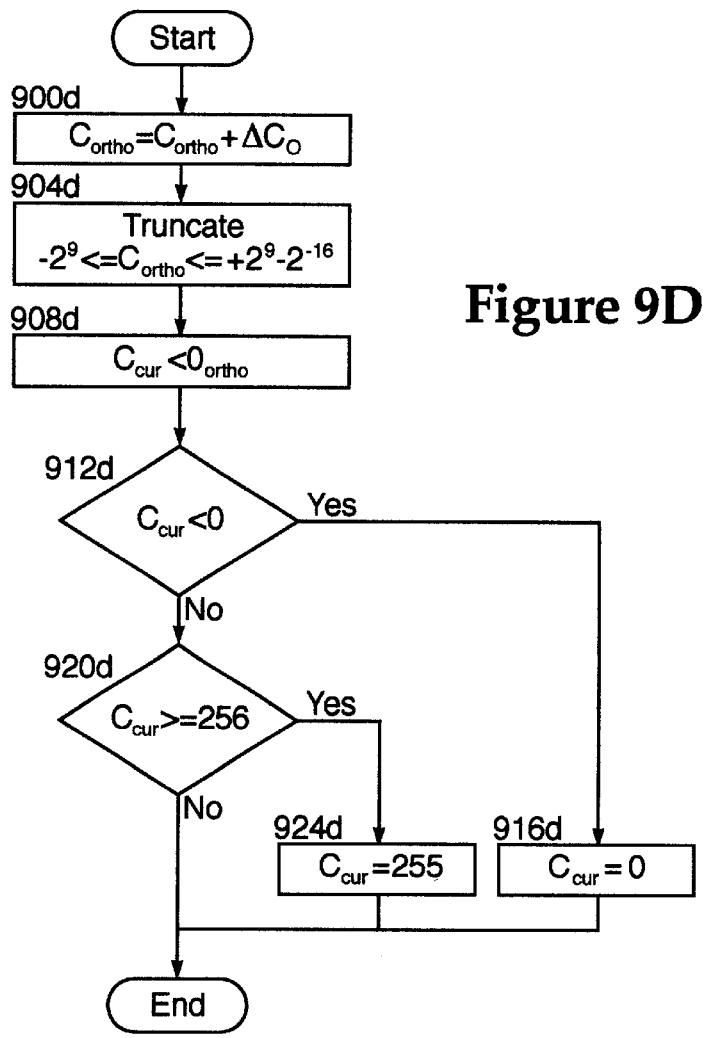
FIG. 9D is a flowchart of the steps for updating an accumulator used for a pixel characteristic other than the z-coordinate in the algorithm of FIG. 9A.

FIG. 9D describes a preferred embodiment of an algorithm for updating a pixel characteristic interpolator to hold the characteristic value of the next pixel on the current scan line, such as in block 936a of FIG. 9A Although the steps of FIG. 9D are generally suitable for any pixel characteristic interpolator, the Z-interpolator preferably handles longer bit-widths than do the other interpolators and are preferably updated according to the steps of FIG. 9E, as described below. FIG. 9D illustrates the steps for updating the interpolator for pixel characteristic "C," which may represent any pixel characteristic other than Z. The program of FIG. 9D is preferably invoked separately to update each pixel characteristic.

Now referring to FIG. 9D, program execution begins at the "start" block, proceeding immediately to block 900d. In block 900d, $C_{ortho}$ is updated by adding $\Delta C_O$ to $C_{ortho}$. Next moving to block 904d, $C_{ortho}$ is truncated such that $C_{ortho}$ lies between −511 (or −$2^9$) and +512 (or +$2^9$). Specifically, −$2^9 \leq C_{ortho} \leq +2^9-2^{-16}$. The truncation accounts for the fact that a computer implementing the steps of FIG. 9D will use a fixed-width accumulator. In a preferred embodiment, $C_{ortho}$ has a 16-bit fractional portion but is represented by a 32-bit signed integer variable. Thus, $C_{ortho}$ is treated as a fixed-point number which is truncated in step 904d by keeping only a sufficient number of bits to retain the fractional portion (16 bits), the integer portion (9 bits), and the sign bit (1 bit), a total of 26 bits. "Truncation" as in step 904d therefore requires sign-extending $C_{ortho}$ from the $26^{th}$ least significant bit. Proceeding from step 904d, $C_{cur}$ is set equal to $C_{ortho}$. After block 904d, $C_{cur}$ is clipped, or saturated, to lie between 0 and +255, as implemented with respect to blocks 912d, 916d, 920d, and 924d.

Beginning with decision block 912d, the program flow branches according to the value of $C_{cur}$. If $C_{cur}<0$, then $C_{cur}$ is set to zero in block 916d, and program execution terminates at the "end" block. If $C_{cur} \geq 0$ in block 912d, then the program moves to decision block 920d, which further branches program flow according to the value of $C_{cur}$. If $C_{cur} \geq 256$ in block 920d, then the program proceeds to block 924d, where $C_{cur}$ is set equal to 255. Following block 924d, the program terminates at the "end" block. If $C_{cur}<256$ in block 920d, the program moves from block 920d to the "end" block, terminating execution without altering $C_{cur}$.

Figure 9E:
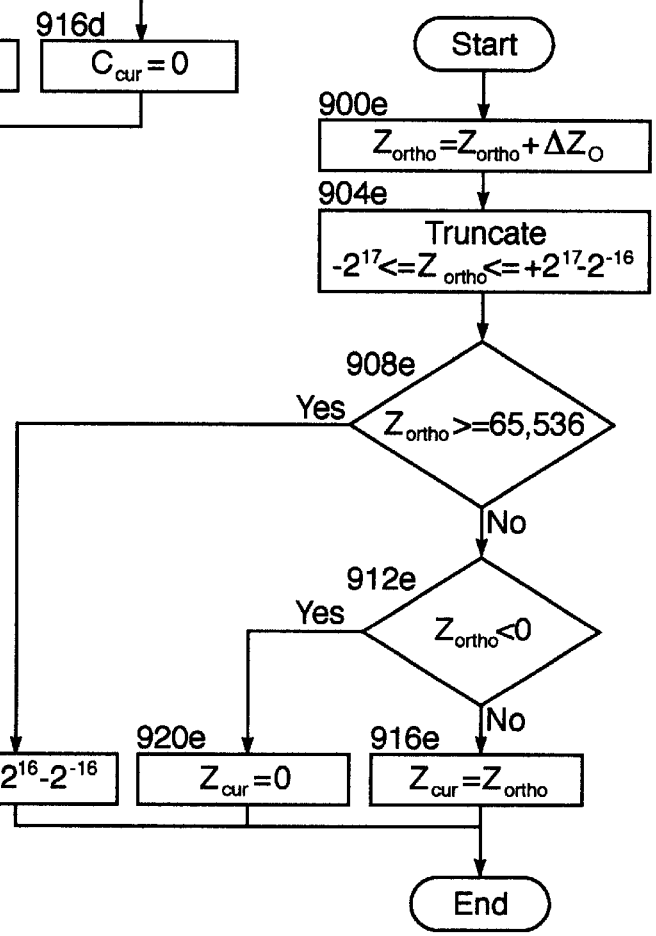
FIG. 9E is a flowchart of the steps for updating the accumulator used for the z-coordinate pixel characteristic in the algorithm of FIG. 9A.
Figure 9F:
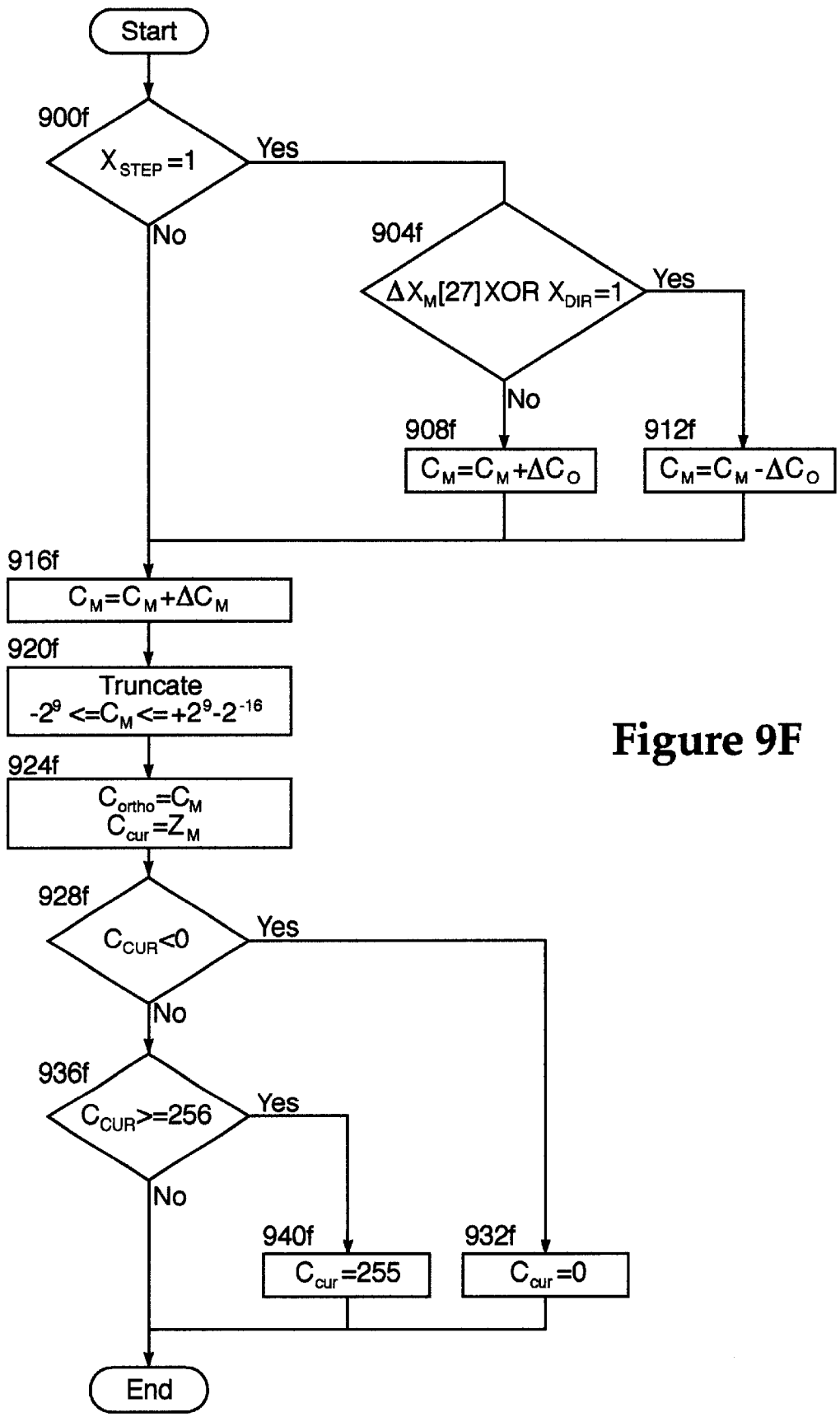
FIG. 9F is a flowchart of the steps for ortho-adjusting an accumulator in the algorithm of FIG. 9D.
Figure 9G:
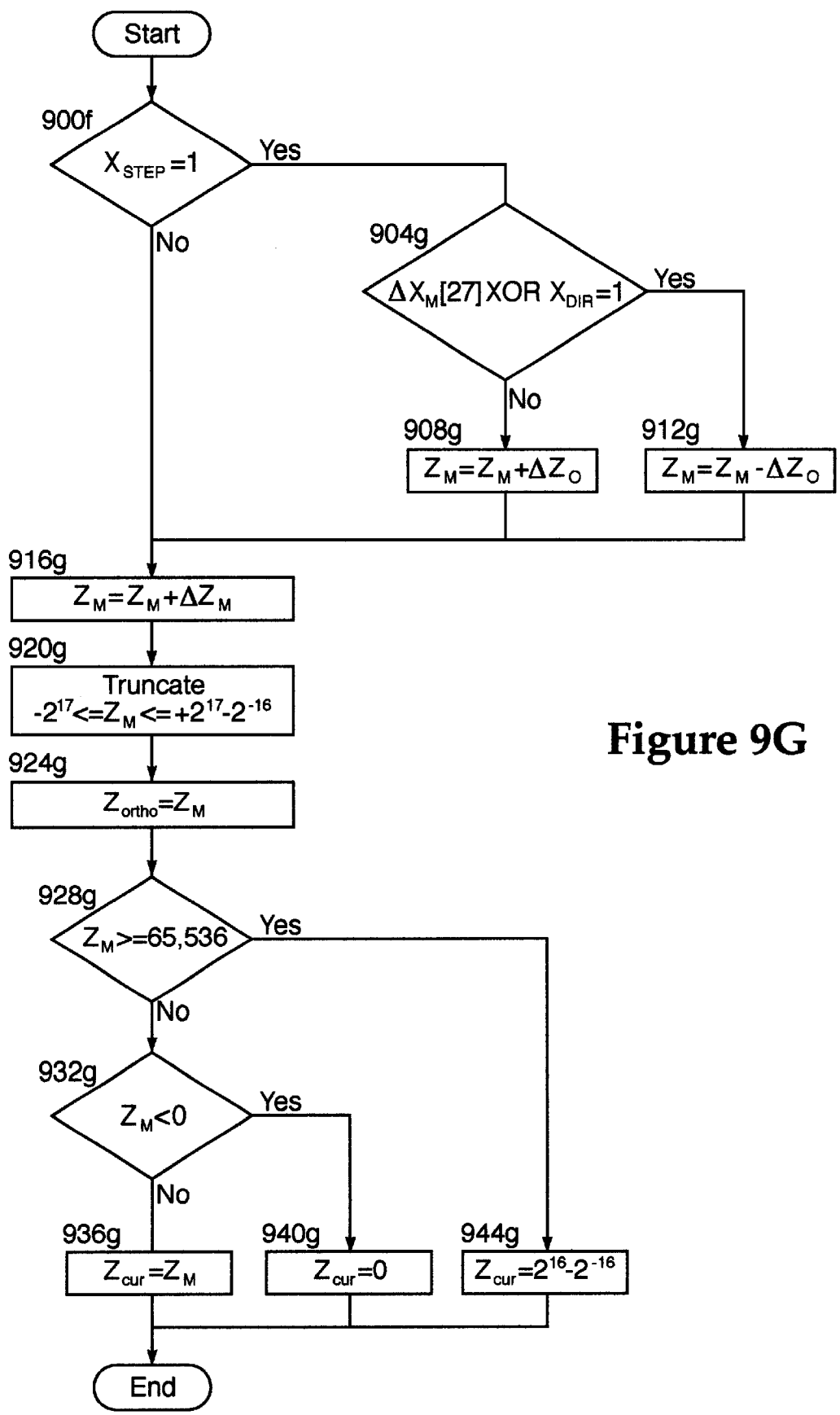
FIG. 9G is a flowchart of the steps for ortho-adjusting an accumulator in the algorithm of FIG. 9E.

Now referring to FIG. 9E, a program for updating the Z-interpolator begins at the "start" block, proceeding immediately to block 900e. In block 900e, $Z_{ortho}$ is incremented by $\Delta Z_O$, the resulting sum preferably represented by a 48-bit signed integer. Next moving to block 904e, $Z_{ortho}$ is truncated such that $Z_{ortho}$ lies between −131,072 (or −$2^{17}$) and +131,072 (or +$2^{17}$). Specifically, −$2^{17} \leq Z_{ortho} \leq +2^{17}-2^{-16}$. The truncation accounts for the fact that a computer implementing the steps of FIG. 9E will use a fixed-width accumulator. In a preferred embodiment, $Z_{ortho}$ has a 16-bit fractional portion but is represented by a 64-bit signed integer variable. Thus, $Z_{ortho}$ is treated as a fixed-point number which is truncated in step 904e by keeping only a sufficient number of bits to retain the fractional portion (16 bits), the integer portion (17 bits), and the sign bit (1 bit), a total of 34 bits. "Truncation" as in step 904e therefore requires sign-extending $Z_{ortho}$ from the $34^{th}$ least significant sign bit. Proceeding from step 904e, the program branches in step 908e according to the value of $Z_{ortho}$. If $Z_{ortho} \geq +65,536$ (or +$2^{16}$), then the program proceeds to block 924e, where $Z_{cur}$ is "saturated down" to +$2^{16}-2^{-16}$. If $Z_{ortho} <+65,536$ in block 908e, then the program proceeds to block 912e, branching again according to the value of $Z_{ortho}$. In block 912e, if $Z_{ortho}<0$, then $Z_{cur}$ is "saturated up" to 0 in block 920e. Otherwise, $Z_{cur}$ is set equal to the 32 least significant bits of $Z_{ortho}$, or $Z_{ortho}[15:0]:Z_{orthoFRAC}$, in block 916e. Blocks 916e, 920e, and 924e each terminate to the "end" block, completing the algorithm.

FIG. 9F describes a preferred embodiment of an algorithm used by a pixel characteristic interpolator to calculate the characteristic value of the main slope pixel of the next scan line, such as in block 968a of FIG. 9A. Although the steps of FIG. 9F are generally suitable for any pixel characteristic interpolator, the Z-interpolator preferably handles longer bit-widths than do the other interpolators and are preferably updated for the next scan line according to the steps of FIG. 9G, as described below. FIG. 9F illustrates the steps for updating the interpolator for pixel characteristic "C," which may represent any pixel characteristic other than Z. The program of FIG. 9F is preferably invoked separately for each pixel characteristic.

The "start" block of FIG. 9F begins the program execution by feeding into decision block 900f. If xstep=1 in block 900f, indicating the need for ortho-adjustment, then program execution proceeds to block 904f, which branches according to the value of $\Delta X_M[27] \oplus X_{DIR}$, where $\oplus$ represents the logical XOR function. If xstep=1 in block 904f, then the program moves to block 916f. If $\Delta X_M[27] \oplus X_{DIR}=1$ in block 904f, then the characteristic value of the next main slope pixel $C_M$ is ortho-adjusted by subtracting $\Delta C_O$ from $C_M$ in block 912f. If $\Delta X_M[27] \oplus X_{DIR}=1$ in block 904f, then $C_M$ is ortho-adjusted by adding $\Delta C_O$ to $C_M$ in block 912f. Blocks 908f and 912f further feed block 916f In block 916f, the next main slope characteristic value is calculated by adding $\Delta C_M$ to the current main slope characteristic value $C_M$. Block 916f feeds block 920f, in which $C_M$ is truncated such that $C_M$ lies between −512 (or −$2^9$) and +511 (or +$2^9$). Specifically, −$2^9 \leq C_M \leq +2^9-2^{-16}$. In a preferred embodiment, $C_M$ has a 16-bit fractional portion but is represented by a 32-bit signed integer variable. Thus, $C_M$ is treated as a fixed-point number which is truncated in step 920f by keeping only a sufficient number of bits to retain the fractional portion (16 bits), the integer portion (9 bits), and the sign bit (1 bit), a total of 26 bits.

After block 920f, $C_{ortho}$ and $C_{cur}$ are set to $C_{ortho}=C_{cur}=C_M$ in block 924f. Because $C_{cur}$ represents a pixel characteristic value appropriate for rendering, $C_{cur}$ is next clipped, or saturated to lie between 0 and +255, as implemented with respect to blocks 928f, 932f, 936f, and 940f. From block 924f, the program moves to decision block 928f, which branches the program flow according to the value of $C_{cur}$. If $C_{cur}<0$, then $C_{cur}$ is set to zero in block 932f, and program execution terminates at the "end" block. If $C_{cur} \geq 0$ in block 928f then the program moves to decision block 936f, which further branches program flow according to the value of $C_{cur}$. If $C_{cur} \geq 256$ in block 936f, then the program proceeds to block 940f, where $C_{cur}$ is set equal to 255. Following block 940f, the program terminates at the "end" block. If $C_{cur}<256$ in block 936f, the program moves from block 936f to the "end" block, terminating execution without altering $C_{cur}$.

FIG. 9G illustrates a preferred embodiment of the algorithm used to update the Z-interpolator to calculate the main slope z-coordinate of the next scan line, as in block 968a of FIG. 9A. The "start" block of FIG. 9G begins the program execution by feeding into decision block 900g. If xstep=1 in block 900g, then the program moves to block 908g. If xstep=1 in block 900g, indicating the need for ortho-adjustment, then program execution proceeds to block 904g, which branches according to the value of $\Delta X_M[27] \oplus X_{DIR}$, where $\oplus$ represents the logical XOR function. If $\Delta X_M[27] \oplus X_{DIR}=1$ in block 904g, then the characteristic value of the next main slope pixel $Z_M$ is ortho-adjusted by subtracting $\Delta Z_O$ from $Z_M$ in block 912g. If $\Delta X_M[27] \oplus X_{DIR}=1$ in block 904g, then $Z_M$ is ortho-adjusted by adding $\Delta Z_O$ to $Z_M$ in block 908g. The result of blocks 912g and 908g preferably are 48-bit two's complement integers. Blocks 912g and 908g feed block 908g. In block 916g, the next main slope characteristic value is calculated by adding $\Delta Z_M$ to the current main slope characteristic value $Z_M$.

Block 916g feeds block 920g, in which $Z_M$ is truncated to be between −131,072 (or −$2^{17}$) and +131,072 (or +$2^{17}$). Specifically, −$2^{17} \leq Z_M \leq +2^{17}-2^{-16}$. In a preferred embodiment, $Z_M$ has a 16-bit fractional portion but is represented by a 64-bit signed integer variable. Thus, $Z_M$ is treated as a fixed-point number which is truncated in step 920g by keeping only a sufficient number of bits to retain the fractional portion (16 bits), the integer portion (17 bits), and the sign bit (1 bit), a total of 34 bits. "Truncation" as in step 920g therefore requires sign-extending $Z_M$ from the 34$^{th}$ least significant bit.

After block 920g; $Z_{ortho}$ is set to $Z_{ortho}=Z_M$ in block 924g. Because $Z_{cur}$ represents a pixel characteristic value appropriate for rendering, $Z_{cur}$ is next clipped, or saturated to lie between 0 and +65,536 (or +2$^{16}$). Taking into account the fractional portion, $Z_{cur}$ is preferably saturated to $0 \leq Z_{cur} \leq 2^{16}-2^{-16}$. Proceeding from block 924g, program execution branches according to the value of $Z_M$. If $Z_M \geq 65,536$, then $Z_{cur}$ is set to $2^{16}-2^{-16}$ in block 944g. If $Z_M<65,536$ in block 928g, then the program moves to decision block 932g, which branches according to the evaluation of $Z_M<0$. If $Z_M<0$, then $Z_{cur}$ is set to 0 in block 940g. Otherwise, $Z_{cur}$ in block 936g is set equal to the 32 least significant bits of $Z_M$. Blocks 936g, 940g, and 944g each terminate to the "end" block, completing the algorithm of FIG. 9G.

Hence, the present invention discloses a graphics processor capable of receiving polygon parameters from a display driver, correcting the polygon parameters to anticipate, or prevent, interpolation error, and then interpolate the polygon parameters to render the polygon. The graphics processor solely implements the error correction, allowing the software driver to focus only on calculating and transmitting the polygon parameters. Thus, the software driver need not deal with error correction calculations and can be designed to operate faster and more simply than before. Further, because the graphics processor corrects the polygon parameters before the polygon parameters are interpolated to render the polygon, the pixel characteristics are correct immediately after they are rendered, with no need for a subsequent error-correction calculation. Hence, the graphics processor implements error correction by actually preventing interpolation errors in the polygon prior to interpolation, as opposed to fixing existing interpolation errors. Because the graphics processor need not implement an extra error correction stage following polygon interpolation, the present invention is adapted to correct and interpolate polygons much more expediently than before.

These features as well as numerous variations and modifications will become apparent to those skilled in the art once the above disclosure is fully appreciated. It is intended that the following claims be interpreted to embrace all such variations and modifications.

We claim:

1. A graphics processor for receiving parameters defining a polygon from a host processor, interpolating said parameters defining a polygon to map said polygon to a pixel grid, and rendering said polygon in successive orthogonal scan lines to be displayed on said pixel grid, said graphics processor comprising:

a host interface for receiving said parameters defining a polygon from said host processor;

a register file coupled to said host interface and capable of storing said parameters defining a polygon; and a polygon engine coupled to said register file for mapping said parameters defining a polygon to said pixel grid, said polygon engine comprising:

an error correction circuit coupled to said register file for calculating corrected parameters to prevent interpolation errors and for storing said corrected parameters into said register file; and an interpolation circuit coupled to said register file for interpolating said corrected parameters to map said polygon to said pixel grid, wherein said error correction circuit replaces a first parameter in said register file with a first corrected parameter.

2. The graphics processor of claim 1, further comprising:

an ortho-adjust unit, coupled to said interpolation circuit asserting an add signal to indicate that a main slope characteristic value should be adjusted by incrementing and asserting a subtract signal to indicate that a main slope characteristic value should be ortho-adjusted by decrementing.

3. The graphics processor of claim 1, wherein said interpolator comprises:

a main slope interpolator for calculating a main slope characteristic value for a main slope pixel and for orthogonally adjusting said main slope characteristic value to compensate for unnecessary prior error correction; and an ortho interpolator coupled to said main slope interpolator for calculating characteristic values for pixels which are on the same scan line as said main slope pixel.

4. The graphics processor of claim 3, wherein said main slope interpolator comprises:

a main slope accumulator coupled to said register file for calculating a preliminary value based upon a previous characteristic value;

an adder/subtractor, coupled to said main slope accumulator and receiving a delta ortho parameter from said register file, said adder/subtractor calculating an ortho-adjusted value based on said preliminary value.

5. The graphics processor of claim 4, wherein said ortho interpolator comprises an ortho accumulator coupled to said register file for receiving said main slope characteristic value from said main slope interpolator, said ortho interpolator calculating an orthogonal characteristic value by incrementing a previous orthogonal characteristic value by a delta ortho parameter.

6. The graphics processor of claim 1, wherein said interpolator circuit further comprises:

an X interpolator for determining if a slope characteristic value should be ortho-adjusted.

7. The graphics processor of claim 6, wherein said X interpolator further comprises:

an accumulator coupled to said register file for calculating pixel coordinates; and a logic circuit coupled to said adder and to said register file, said logic circuit providing an indicator signal to signify that a main slope characteristic value should be ortho-adjusted, based upon a value in said register file and the state of said accumulator.

8. A graphics processor for receiving parameters defining a polygon from a host processor, interpolating said parameters defining a polygon to map said polygon to a pixel grid, and rendering said polygon in successive orthogonal scan lines to be displayed on said pixel grid, said graphics processor comprising:

a host interface for receiving said parameters defining a polygon from said host processor;

a register file coupled to said host interface and capable of storing said parameters defining a polygon; and a polygon engine coupled to said register file for mapping said parameters defining a polygon to said pixel grid, said polygon engine comprising:

an error correction circuit coupled to said register file for calculating corrected parameters to prevent interpolation errors and for storing said corrected parameters into said register file; and an interpolation circuit coupled to said register file for interpolating said corrected parameters to map said polygon to said pixel grid, wherein said error correction circuit comprises a multiplier receiving a multiplicand from said register file and an adder coupled to said multiplier for receiving an addend from said register file, and wherein said polygon engine uses said error correction circuit to calculate each of said corrected parameters.

9. The graphics processor claim 8, wherein said error correction circuit further comprises:

a first multiplexer coupled to said adder for selecting said addend; and a second multiplexer coupled to said multiplier for selecting said multiplicand.

10. The graphics processor of claim 8, wherein a corrected starting parameter is calculated by adding an uncorrected starting parameter to the product of a delta ortho parameter and a starting x-coordinate.

11. The graphics processor of claim 8, wherein a corrected delta main parameter is calculated by adding an uncorrected delta main parameter to the produce of a delta ortho parameter and a delta X-main parameter.

12. The graphics processor of claim 8, further comprising:

an ortho-adjust unit, coupled to said interpolation circuit asserting an add signal to indicate that a main slope characteristic value should be adjusted by incrementing and asserting a subtract signal to indicate that a main slope characteristic value should be ortho-adjusted by decrementing.

13. The graphics processor of claim 8, wherein said interpolator comprises:

a main slope interpolator for calculating a main slope characteristic value for a main slope pixel and for orthogonally adjusting said main slope characteristic value to compensate for unnecessary prior error correction; and an ortho interpolator coupled to said main slope interpolator for calculating characteristic values for pixels which are on the same scan line as said main slope pixel.

14. The graphics processor of claim 13, wherein said main slope interpolator comprises:

a main slope accumulator coupled to said register file for calculating a preliminary value based upon a previous characteristic value;

an adder/subtractor, coupled to said main slope accumulator and receiving a delta ortho parameter from said register file, said adder/subtractor calculating an ortho-adjusted value based on said preliminary value.

15. The graphics processor of claim 14, wherein said ortho interpolator comprises an ortho accumulator coupled to said register file for receiving said main slope characteristic value from said main slope interpolator, said ortho interpolator calculating an orthogonal characteristic value by incrementing a previous orthogonal characteristic value by a delta ortho parameter.

16. The graphics processor of claim 8, wherein said interpolator circuit further comprises:

an X interpolator for determining if a slope characteristic value should be ortho-adjusted.

17. The graphics processor of claim 16, wherein said X interpolator further comprises:

an accumulator coupled to said register file for calculating pixel coordinates; and a logic circuit coupled to said adder and to said register file, said logic circuit providing an indicator signal to signify that a main slope characteristic value should be ortho-adjusted, based upon a value in said register file and the state of said accumulator.

18. A graphics processor capable of rendering a polygon onto a pixel grid array, said graphics processor comprising:

a register file for storing polygon parameters;

an interpolator coupled to said register file for mapping said polygon parameters to said pixel grid array; and an error correction engine coupled to said register file and for removing interpolation error from said polygon, wherein said error correction engine reads a first polygon parameter from said register file, calculates a corrected parameter, and replaces said first polygon parameter with said corrected parameter in said register file.

19. The graphics processor of claim 18, further comprising:

an ortho-adjust unit coupled to said interpolator, for adjusting main slope pixel values not requiring prior error correction.

20. A graphics processor capable of rendering a polygon onto a pixel grid array, said graphics processor comprising:

a register file for storing polygon parameters;

an interpolator coupled to said register file for rendering said polygon onto said pixel grid array; and an error correction engine coupled to said register file for removing interpolation errors from said polygon parameters and for permitting said interpolator to render said polygon without the need for error correction parameters in addition to said polygon parameters, wherein said error correction engine reads a first polygon parameter from said register file, calculates a corrected parameter, and replaces said first polygon parameter with said corrected parameter in said register file.

21. The graphics processor of claim 20, wherein said interpolator uses said corrected parameter to render said polygon.

22. A method of rendering a polygon onto a pixel grid array, comprising the steps of:

receiving polygon parameters describing said polygon from a register file, correcting said polygon parameters to remove interpolation error, and mapping said polygon onto said pixel grid by interpolating the corrected polygon parameters from said step of correcting said polygon parameters, wherein said step of correcting said polygon parameters further comprises the steps of:

reading a first polygon parameter from the register file;

calculating said corrected polygon parameter based on said first polygon parameter; and replacing said first polygon parameter with said corrected polygon parameter in the register file.

23. The method of claim 22, wherein said step of correcting said polygon parameters further comprises the steps of:

calculating the product of a delta ortho parameter and starting x-coordinate, and adding a starting characteristic parameter to the product calculated in said step of receiving polygon parameters.

24. The method of claim 22, wherein said step of correcting said polygon parameters further comprises the steps of:

calculating the product of a delta ortho parameter and a delta x-main parameter, and adding a delta main characteristic parameter to the product calculated in said step of receiving polygon parameters.

25. The method of claim 22, wherein said step of mapping said polygon further comprises the steps of:

reading said corrected polygon parameter from said register file, and determining a characteristic value for a pixel in said pixel grid array based upon said corrected polygon parameter.

26. The method of claim 25, wherein said step of reading said corrected polygon parameter from said register file further comprises the step of:

determining said characteristic value by adding said corrected polygon parameter to a previous characteristic value.

27. The method of claim 26, wherein said corrected polygon parameter defines the rate of change of said characteristic value along the main slope of a polygon.

28. The method of claim 18, further comprising the steps of:

selecting a second parameter and a third parameter from said register file, multiplying said second parameter with said third parameter, and calculating said corrected parameter by adding the first parameter to the product of the second and third parameters.

29. The of claim 28, wherein the first parameter is the starting parameter of a pixel characteristic.

30. The method of claim 28, wherein the first parameter is the delta main parameter of a pixel characteristic.

31. A method for interpolating a polygon onto a pixel grid array using polygon parameters, said method comprising the steps of:

correcting the polygon parameters to remove interpolation errors; and calculating characteristic values for the pixels in said pixel grid array using the corrected parameters, wherein said step of correcting the polygon parameters further comprises the steps of:

calculating the product of a horizontal gradient and an x-coordinate, and adding a characteristic starting parameter to the product in said step of calculating the product of a horizontal gradient and an x-coordinate to produce a corrected characteristic starting parameter.

32. The method of claim 31, wherein said step of correcting the polygon parameters and said step of calculating characteristic values are implemented entirely by a graphics processor.

33. The method of claim 32, wherein said step of correcting the polygon parameters further comprises the steps of:

receiving the polygon parameters from a host processor, storing the polygon parameters into a register file, calculating corrected parameters based upon the polygon parameters, and replacing the polygon parameters in said register file with the corrected parameters.

34. A method for interpolating a polygon onto a pixel grid array using polygon parameters, said method comprising the steps of:

correcting the polygon parameters to remove interpolation errors; and calculating characteristic values for the pixels in said pixel grid array using the corrected parameters, wherein said step of correcting the polygon parameters further comprises the steps of:

calculating the product of a horizontal gradient and an X-main slope parameter, and adding a characteristic main slope gradient parameter to the product in said step of calculating the product of a horizontal gradient and an X-main slope parameter to produce a corrected characteristic main slope gradient parameter.

35. The method of claim 34, wherein said step of correcting the polygon parameters and said step of calculating characteristic values are implemented entirely by a graphics processor.

36. The method of claim 35, wherein said step of correcting the polygon parameters further comprises the steps of:

receiving the polygon parameters from a host processor, storing the polygon parameters into a register file, calculating corrected parameters based upon the polygon parameters, and replacing the polygon parameters in said register file with the corrected parameters.

37. A method for preventing interpolation errors in a polygon that is rendered onto a pixel grid array, comprising:

(a) determining polygon parameters that define the location and characteristic values of the polygon, said polygon parameters including a characteristic starting parameter, a characteristic main slope parameter, an orthogonal gradient parameter, a starting x-coordinate, and a X-main slope parameter;

(b) calculating a corrected starting parameter by adding the characteristic starting parameter to the product of the orthogonal gradient parameter and the starting x-coordinate;

(c) calculating a corrected main slope parameter by adding the characteristic main slope parameter to the product of the orthogonal gradient parameter and the starting X-main slope parameter; and (d) interpolating the polygon onto the pixel grid array using the corrected parameters calculated in steps (c) and (d).

38. A method as in claim 37 wherein a software driver determines the polygon parameters in step (a) and wherein a graphics processor corrects the parameters in steps (b) and (c) and renders the polygon in step (d).

39. A computer readable storage medium for storing an executable set of software instructions which, when integrated into a host computer system, are capable of controlling the operation of the host computer, said software instructions being operable to may a polygon onto a pixel grid array by interpolation of polygon parameters, said software instructions comprising:

means for storing the polygon parameters;

means for correcting the polygon parameters in said means for storing the polygon parameters to prevent error during interpolation; and means for interpolating the corrected polygon parameters held in said means for storing the polygon parameters to render the polygon into an array of pixels, wherein said means for correcting the polygon parameters comprises:

means for retrieving the polygon parameters from said means for storing the polygon parameters;

means for calculating a proportional error term;

means for applying the proportional error term to an uncorrected polygon parameter to produce a corrected parameter; and means for storing the corrected parameter into said means for storing the polygon parameters.

40. The invention of claim 38 wherein the proportional error term is proportional to a starting x-coordinate.

41. The invention of claim 38 wherein the proportional error term is proportional to a delta X-main coordinate.

42. The invention of claim 38 wherein said means for calculating a proportional error term comprises:

means for reading a starting characteristic parameter, a delta ortho parameter, a fractional starting x-coordinate, and a rendering direction from said means for storing the polygon parameters;

means for calculating the absolute value of the error term as the product of the delta ortho parameter and the fractional starting x-coordinate;

determining the sign of the error term as negative if the rendering direction is positive; and determining the sign of the error term as positive if the rendering direction is negative.

43. The invention of claim 38 wherein said means for applying the proportional error term comprises means for adding the proportional error term to the uncorrected polygon parameter.

44. A method for calculating the characteristic values of a polygon for rendering the polygon onto a pixel grid array, said polygon defined by a set of polygon parameters, comprising:

(a) correcting the polygon parameters for interpolation error;

(b) calculating main slope characteristic values for a main slope pixel;

(c) applying main slope characteristic values to a main slope pixel;

(d) calculating adjacent characteristic values for an adjacent pixel on the same scan line as the starting pixel;

(e) applying the adjacent characteristic values to the adjacent pixel if the polygon includes said adjacent pixel; and (f) implementing step (a) before implementing any other step.

45. A method as in claim 44 wherein step (a) comprises:

(a1) calculating a first error term;

(a2) calculating a corrected first characteristic parameter by adding said starting error term to a first characteristic parameter; and (a3) saturating said first characteristic parameter to lie between a pair of predetermined minimum and maximum limits.

46. A method as in claim 45 wherein the first error term is proportional to a fractional x-coordinate and wherein the sign of the first error term is determined by the rendering direction.

47. A method as in claim 45 wherein the first error term is proportional to a fractional X-main parameter and wherein the sign of the first error term is determined by the rendering direction.

48. A method as in claim 44 wherein step (b) comprises:

(b1) determining if the main slope pixel is the starting pixel of the polygon;

(b2) setting the main slope characteristic value equal to a predetermined starting parameter if step (b1) is true;

(b3) calculating the main slope characteristic value by incrementing a previous main slope pixel by a delta main parameter if (b1) is false; and (b4) saturating the main slope characteristic value to lie between a pair of predetermined minimum and maximum limits.

49. A method as in claim 45 including adjusting the main slope characteristic value by a delta main parameter.

50. A method as in claim 45 wherein step (d) comprises:

(d1) calculating a first adjacent characteristic value by incrementing a previous characteristic value by a delta ortho parameter; and (d2) saturating the first adjacent characteristic value to lie between a pair of predetermined minimum and maximum limits.

* * * * *